United States Patent
Sato

(10) Patent No.: US 10,209,673 B2
(45) Date of Patent: Feb. 19, 2019

(54) HOLOGRAPHIC MICROSCOPE, MICROSCOPIC SUBJECT HOLOGRAM IMAGE RECORDING METHOD, METHOD OF CREATION OF HOLOGRAM FOR REPRODUCTION OF HIGH-RESOLUTION IMAGE, AND METHOD FOR REPRODUCTION OF IMAGE

(75) Inventor: Kunihiro Sato, Himeji (JP)

(73) Assignee: University of Hyogo, Kobe-shi (JP)

( * ) Notice: Subject to any disclaimer, the term of this patent is extended or adjusted under 35 U.S.C. 154(b) by 1007 days.

(21) Appl. No.: 13/808,450

(22) PCT Filed: Jul. 7, 2011

(86) PCT No.: PCT/JP2011/065531
§ 371 (c)(1),
(2), (4) Date: Jan. 4, 2013

(87) PCT Pub. No.: WO2012/005315
PCT Pub. Date: Jan. 12, 2012

(65) Prior Publication Data
US 2013/0100241 A1 Apr. 25, 2013

(30) Foreign Application Priority Data
Jul. 7, 2010 (JP) .................................. 2010-155024

(51) Int. Cl.
*H04N 9/47* (2006.01)
*H04N 7/18* (2006.01)
(Continued)

(52) U.S. Cl.
CPC ........... *G03H 1/0443* (2013.01); *G02B 21/06* (2013.01); *G02B 21/36* (2013.01); *G03H 1/0866* (2013.01);
(Continued)

(58) Field of Classification Search
CPC .... G03H 1/2294; G03H 1/02; G03H 2210/30; G03H 1/22; G03H 1/2205;
(Continued)

(56) References Cited

U.S. PATENT DOCUMENTS

| 6,411,406 B1 | 6/2002 | Kreuzer | |
| 2004/0212807 A1* | 10/2004 | Hanson et al. | 356/458 |

(Continued)

FOREIGN PATENT DOCUMENTS

| JP | 2007-114552 A | 5/2007 |
| JP | 2010-517102 A | 5/2010 |

OTHER PUBLICATIONS

European Search Report dated Nov. 29, 2013 (13 pages).
(Continued)

*Primary Examiner* — Farhan Mahmud
(74) *Attorney, Agent, or Firm* — Crowell & Moring LLP

(57) ABSTRACT

An interference fringe pattern ($I_{LR}$) between an inline spherical wave light (L) and an off-axis reference light (R) is recorded with a photo detector (4), and on which spatial-frequency filtering is applied to obtain a complex amplitude in-line hologram ($J_{LR}$). A complex amplitude off-axis hologram ($J_{OR}$) is derived by performing a spatial frequency filtering on a hologram ($I_{OR}$) in which an object light (O) emitted from a microscopic subject illuminated with a spherical wave light (L) is recorded with a reference light (R), and the derived data is divided with data of the hologram ($J_{LR}$) so that a complex amplitude in-line hologram ($J_{OL}$) from which a component of the reference light (R) is eliminated is generated and recorded.

24 Claims, 21 Drawing Sheets

(51) Int. Cl.
　　　G03H 1/04　　　(2006.01)
　　　G02B 21/06　　(2006.01)
　　　G03H 1/08　　　(2006.01)
　　　G02B 21/36　　(2006.01)
　　　G03H 1/00　　　(2006.01)
(52) U.S. Cl.
　　　CPC ............ *H04N 7/18* (2013.01); *G03H 1/0465* (2013.01); *G03H 2001/005* (2013.01); *G03H 2001/0447* (2013.01); *G03H 2001/0456* (2013.01); *G03H 2001/0469* (2013.01); *G03H 2001/0471* (2013.01); *G03H 2001/0825* (2013.01); *G03H 2001/0883* (2013.01); *G03H 2210/12* (2013.01); *G03H 2210/55* (2013.01); *G03H 2210/62* (2013.01); *G03H 2210/63* (2013.01); *G03H 2222/44* (2013.01); *G03H 2222/54* (2013.01); *G03H 2222/56* (2013.01); *G03H 2240/62* (2013.01)
(58) Field of Classification Search
　　　CPC .... G03H 2225/32; G03H 1/08; G03H 1/2249; G03H 2001/2271; G03H 1/0011; G03H 2001/2242; G03H 2223/19; G03H 2225/55; G03H 1/04; G03H 1/0808; G03H 2001/0224; G03H 2001/0825; G03H 2222/34; G03H 2001/2297; G03H 2223/18; G03H 2226/05; G03H 1/0005; G03H 1/0248; G03H 1/0866; G03H 1/20; G03H 2210/22; G03H 2210/454; G03H 2222/18; G03H 2225/22; G03H 2225/33; G03H 1/202; G03H 1/265; G03H 1/28; G03H 1/32; G03H 2001/2218; G03H 2225/31; G03H 1/0443; G03H 1/26; G03H 1/30; G03H 2001/0413; G03H 2001/0439; G03H 2227/03; G03H 1/0236; G03H 1/041; G03H 1/0841; G03H 1/0891; G03H 1/16; G03H 1/268; G03H 2001/005; G03H 2001/0088; G03H 2001/0212; G03H 2001/0456; G03H 2001/0497; G03H 2001/0858; G03H 2001/2221; G03H 2001/2223; G03H 2001/2231; G03H 2001/2239; G03H 2001/261; G03H 2001/2615; G03H 2001/264; G03H 2001/303; G03H 2210/52; G03H 2222/35; G03H 2222/36; G03H 2223/12; G03H 2223/20; G03H 2223/24; G03H 2225/52; G03H 2225/60; G03H 2226/02; G03H 2227/06; G03H 2240/41; G03H 2240/42; G03H 2240/56; G03H 2250/42; G03H 2260/12; G03H 1/00; G03H 1/0408; G03H 1/18; G03H 2001/0094; G03H 2001/0264; G03H 2222/50; G03H 2222/52; G03H 2222/53; G03H 2222/54; G03H 2222/55; G03H 2223/25; G03H 2223/55; G03H 2224/02; G03H 2225/20; G03H 2225/23; G03H 2225/25; G03H 2225/35; G03H 2225/36; G03H 2225/61; G03H 2226/04; G03H 2227/05; G03H 2240/13; G03H 2240/15; G03H 2240/21; G03H 2240/50; G03H 2240/53; G03H 2250/33; G03H 2250/34; G03H 2250/37; G03H 2250/39; G03H 2260/14; G03H 2260/34; G03H 2260/52; G03H 2260/54; G03H 2270/31; G03H 2270/54; G03H 2270/55; G03H 3/00; G11B 7/0065; G11B 7/083; G11B 7/00772; G11B 7/1353; G11B 7/1369; G11B 2007/0013; G11B 2220/2504; G02B 5/32; H04N 9/3161
　　　See application file for complete search history.

(56)　　　　　　References Cited

U.S. PATENT DOCUMENTS

2008/0137933 A1* 　6/2008　Kim ............................. 382/131
2009/0027747 A1 　　1/2009　Lee et al.
2009/0244667 A1* 10/2009　Frentz et al. ................... 359/22
2010/0110260 A1* 　5/2010　Shin et al. ..................... 348/311
2010/0309465 A1* 12/2010　Liu et al. ....................... 356/301

OTHER PUBLICATIONS

Zhou et al. "Study on aberration suppressing methods in digital micro-holography", Optics and Lasers in Engineering, vol. 47, No. 2, Feb. 1, 2009, pp. 264-270, Elsevier, Amsterdam, NL.
Ichirou Yamaguchi, et al., "Image formation in phase-shifting digital holography and applications to microscopy", Applied Optics, Dec. 1, 2001, vol. 40, No. 34, pp. 6177-6186.
W. Xu, et al., "Digital in-line holography of microspheres", Applied Optics, Sep. 1, 2002, vol. 41, No. 25, pp. 5367-5375.
International Search Report including English translation dated Oct. 18, 2011 (two (2) pages).

* cited by examiner

LIGHT INTENSITY:
$I_{oR} = O_0^2 + R_0^2 + O_0 R_0 \exp[i(\phi_o - \phi_R)] + O_0 R_0 \exp[-i(\phi_o - \phi_R)]$
PIXEL INTERVAL: d
SPATIAL FREQUENCY: $f_s$ (=1/d)

LIGHT INTENSITY:
$I_{LR} = L_0^2 + R_0^2 + L_0 R_0 \exp[i(\phi_L - \phi_R)] + L_0 R_0 \exp[-i(\phi_L - \phi_R)]$
PIXEL INTERVAL: d
SPATIAL FREQUENCY: $f_s$ (=1/d)

FIG. 25A
FIG. 25B
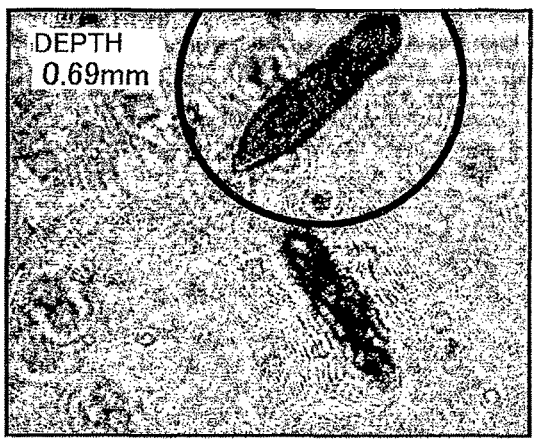
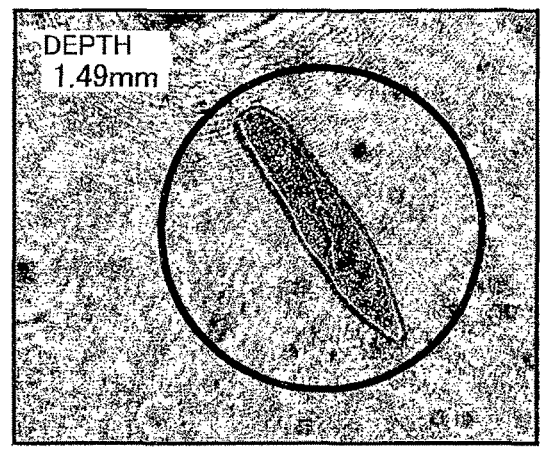

FIG. 27

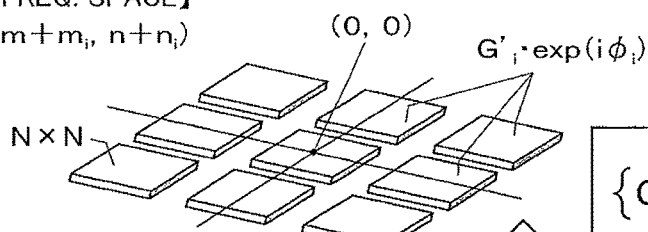

【FREQ. SPACE】
$(m+m_i, n+n_i)$
$(0, 0)$
$G'_i \cdot \exp(i\phi_i)$
$N \times N$

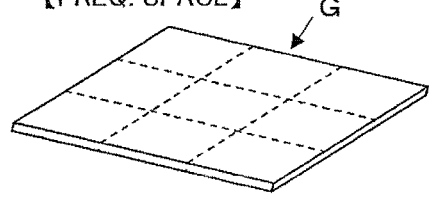

ZONE CONTINUATION
$\{G'_i \cdot \exp(i\phi_i)\} \to G$

FREQUENCY SHIFT
$G'_i \to G'_i \cdot \exp(i\phi_i)$

【FREQ. SPACE】
$(m, n)$

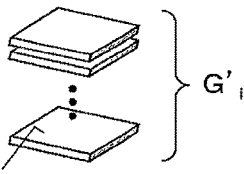

$G'_i$
$N \times N$

【FREQ. SPACE】 $G$

DISCRETE FOURIER TRANSFORM
$$G'_i(m,n) = \sum_{k=0}^{N-1}\sum_{l=0}^{N-1}\{g_i(k,l)\exp[-i\phi_i(k,l)]\}\exp[-i2\pi(\frac{mk+nl}{N})]$$

FREQUENCY LOWERING
$g_i \to g_i \cdot \exp(-i\phi_i)$

【REAL SPACE】
$(k, l)$

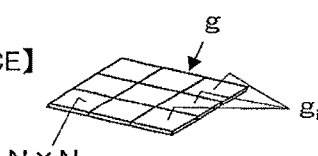

$g$
$g_i$
$N \times N$

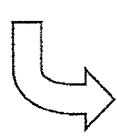

$g_i$

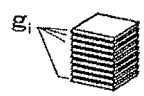

$\Sigma$

FOURIER TRANSFORM

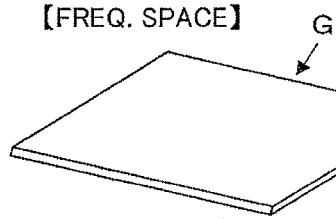

【FREQ. SPACE】 $G$

• PIXEL NUMBER INCREASE
• PILE UP

COMPOSED
MINUTE HOLOGRAM $\Sigma$
$\Sigma = \Sigma g_i$

HOLOGRAPHIC MICROSCOPE, MICROSCOPIC SUBJECT HOLOGRAM IMAGE RECORDING METHOD, METHOD OF CREATION OF HOLOGRAM FOR REPRODUCTION OF HIGH-RESOLUTION IMAGE, AND METHOD FOR REPRODUCTION OF IMAGE

TECHNICAL FIELD

The present invention relates to a holographic microscope, a method for recording a hologram image of a microscopic subject, a method for generating a hologram for high-resolution image reconstruction, and a method for reconstructing an image based on an off-axis holography using a spherical wave light as an illuminating light.

BACKGROUND ART

In recent years, holographic microscopes using digital holography are proposed variously for improving conventional optical microscopes (for example, refer to non-patent document 1). In the case of a usual optical microscope, it is necessary to adjust the focal distance of an image formation lens when the position of a viewpoint changes, because depth of focus of the usual optical microscope is very shallow. Accordingly, it is not so easy to observe a microscopic subject like a microbe etc. moving frequently in a three-dimensional space using the optical microscope. A holographic microscope can reconstruct (reproduce) a image of an observation object at an arbitrary focal distance by numerical computation using a recorded hologram in which a spatial distribution of amplitude and phase of an object light from the observation object is recorded with a photodetector. Moreover, since the holographic microscope can reconstruct the phase distribution of object light, it is applicable to quantitative analysis of a light transmission object.

By the way, a holographic microscope is classified roughly two: one uses an image formation lens inserted between a microscopic subject and a photodetector; and the other does not use such an image formation lens. A magnified three-dimensional image can be recorded as a hologram by magnifying a three-dimensional image of a microscopic subject in front of a photodetector using an image formation lens, and a high-resolution image is easily obtained from this record hologram. However, if an image is magnified using an image formation lens, the depth of recordable space will be restricted or the depth of focus of a magnified image will become shallow. Moreover, since some distortion and out-of-focus arises in an image magnified by the lens, a right-shaped image can not be obtained. Furthermore, a lens cannot usually be used as-it-is, for example, underwater which differ from air, since a lens functions according to refractive index difference to the air at lens boundary. That is, since an image formation lens of a microscope is designed on an assumption for observing a photographic subject in air or a photographic subject of thin thickness covered with a cover glass, if a photographic subject is in a deep position in water not in air, an image recorded through such a lens becomes an image with some distortion or out-of-focus.

Holographic microscopes using a spherical wave light, not using an image formation lens, are known (for example, refer to non-patent document 2 and patent document 1). These holographic microscopes are transmission type microscopes of Gabor type in-line holography and record interference fringe pattern between an un-scattered transmitted light and a scattered transmitted light caused by illuminating a photographic subject with one spherical wave light which spreads from a pinhole. Since these holographic microscopes record an object light with a large numerical aperture (NA) without using an image formation lens, a three-dimensional image of a microscopic subject existing in space with depth can be recorded as a hologram, and also can record a microscopic subject in a medium like water. Moreover, the patent document 1 discloses a method to reconstruct a distortionless image using an exact solution of Helmholtz equation in order to reconstruct a distortionless high-resolution image from a large numerical aperture hologram.

PRIOR ART DOCUMENTS

Non-Patent Documents

Non-patent document 1: Ichirou Yamaguchi, Jun-ichi Kato, Sohgo Ohta, and Jun Mizuno, "Image formation in phase-shifting digital holography and application to microscopy", APPLIED OPTICS Vol. 40, No. 34, pp 6177-6186 (2001)

Non-patent document 2: W. Xu, M. H. Jericho, I. A. Meinertzhagen, and H. J. Kreuzer "Digital in-line holography of microspheres", APPLIED OPTICS Vol. 41, No. 25, pp 5367-5375 (2002)

Patent Documents

Patent document 1: The U.S. Pat. No. 6411406

DISCLOSURE OF THE INVENTION

However, in the holographic microscopes using one spherical wave light as mentioned above, which do not need an image formation lens, since the transmitted light through the photographic subject without being scattered is used as a reference light and also the light scattered by the photographic subject is used as an object light, an observable photographic subject is limited to a photographic subject like particulates scattered in air or a medium, or a light transmission object with thin thickness of a transmission factor very near 1. Moreover, since the holography is of an in-line system, the reconstructed object light overlaps with the 0th light and a conjugate light. For this reason, not only the quality of the reconstructed image deteriorates, but also it is difficult to obtain a phase distribution of reconstructed object light correctly.

By the way, if a hologram can be recorded at high speed using a holographic microscope, the animation of a microscopic subject can be recorded. Moreover, if images are reconstructed at high speed from holograms, a motion of a microscopic subject can be observed in real time. What is necessary is just to carry out single shot record of the complex amplitude in-line hologram with a large numerical aperture (NA) in order to record a microscopic subject moving in a space with depth by high resolution and high speed. In general, phase-shifting digital holography technology is used as the record method of a complex amplitude in-line hologram, however, this technology does not serve as single shot record, since this technology shifts a phase and records holograms of three or more sheets one by one to record one complex amplitude hologram.

Moreover, in order to reconstruct a not-distorted high-resolution image from a large numerical aperture hologram, it is necessary to reconstruct high-resolution object light, i.e., object light distribution, from a large numerical aperture complex amplitude in-line hologram using the exact solution of Helmholtz equation. Moreover, since a pixel interval of a photodetector is usually larger than a light wavelength, there is a problem that the resolution of a reconstructed image will be restricted by the pixel interval of the photodetector when the image is reconstructed as it is from the hologram recorded with such photodetector, and thus a high-resolution around the light wavelength cannot be attained. By the image reconstruction method shown in the above-mentioned patent document 1, nonlinear coordinate transformation is introduced in order to solve this problem, however, improvement in the speed of image reconstruction is difficult, since the computational complexity of image reconstruction increases by introducing this coordinate transformation.

The present invention is to solve the above problems, and an object of the present invention is to provide a method for recording a hologram image of a microscopic subject which can record a complex amplitude in-line hologram with a large numerical aperture by one shot without using an image formation lens, to provide a method for generating a hologram for high-resolution image reconstruction, wherein the hologram can reconstruct a image of no-distortion and of high-resolution over the restriction caused by a pixel interval of a photodetector, to provide a method for reconstructing an image which can overcome the increase of the computational complexity accompanying the increase in the number of sampling points, and to provide a holographic microscope with which it is possible to record and reconstruct a hologram at high speed and observe a motion of a microscopic subject by using those above methods by easy constitution.

In order to achieve the above object, the present invention provides a holographic microscope, comprising: an image recording section which obtains an off-axis hologram ($I_{OR}$) of a microscopic subject by illuminating the microscopic subject with a spherical wave light (L or L2) as an illumination light, generates a complex amplitude in-line hologram ($J_{OL}$) from the off-axis hologram ($I_{OR}$), and records the complex amplitude in-line hologram ($J_{OL}$); and an image reconstruction section which reconstructs an image from the complex amplitude in-line hologram ($J_{OL}$) recorded by the image recording section, wherein the image recording section comprises: a light source which emits a coherent light; an optical system which propagates an illumination light, a reference light, and an object light; a photodetector which records light intensity of the reference light and the object light; a reference light wave obtaining section which records an interference fringe pattern ($I_{LR}$) between an in-line spherical wave light (L) and an off-axis reference light (R), which is made with the light source and the optical system, using the photodetector, and derives a complex amplitude hologram ($J_{LR}$) having recorded the off-axis reference light (R) by performing a spatial frequency filtering on the interference fringe pattern ($I_{LR}$); and a complex amplitude obtaining section which illuminates a microscopic subject using the light source and the optical system with a spherical wave light (L or L2), which has the same focal point as the in-line spherical wave light (L), as an illumination light, and derives a complex amplitude off-axis hologram ($J_{OR}$) by performing a spatial frequency filtering on an off-axis hologram ($I_{OR}$) in which an object light (O) emitted from the microscopic subject is recorded with an off-axis reference light (R) using the photodetector, wherein the image recording section generates and records a complex amplitude hologram ($J_{OL}$) by eliminating a component of the reference light (R) from the complex amplitude off-axis hologram ($J_{OR}$) by performing a dividing process on data of the complex amplitude off-axis hologram ($J_{OR}$) derived by the complex amplitude obtaining section with data of the complex amplitude hologram ($J_{LR}$) obtained by the reference light wave obtaining section.

In the holographic microscope, the image reconstruction section may comprise: a pixel number increase section which increases a number of pixels substantially by subdividing the spatial sampling interval of the complex amplitude in-line hologram ($J_{OL}$) and performing a data interpolation on a new sampling point produced by the subdividing; a spatial modulation section which generates an object light complex amplitude in-line hologram (g) expressing the object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$) having the increased number of pixels increased by the pixel number increase section; and a plane wave expansion section which derives a transform function (G) as a result of Fourier-transforming of the object light complex amplitude in-line hologram (g) and expands the object light (O) using the transform function (G) and spatial frequencies (u, v, w) satisfying the dispersion relation of a plane wave, wherein the image reconstruction section generates a light wave (h) on a hologram plane or on an arbitrary position before and behind thereof.

The plane wave expansion section mentioned above may comprise: a division section which divides the object light complex amplitude in-line hologram (g) into a plurality of minute holograms ($g_i$); and a synthesis section which generates a synthetic minute hologram ($\Sigma$) by piling up mutually each of the minute holograms ($g_i$) generated by the division section, wherein the plane wave expansion section derives the transform function (G) by Fourier-transforming the synthetic minute hologram ($\Sigma$) generated by the synthesis section.

In the holographic microscope, the image reconstruction section may comprise: a division interpolation section either which generates a plurality of minute holograms ($g_i'$) having a substantially increased number of pixels by dividing the complex amplitude in-line hologram ($J_{OL}$) into a plurality of minute holograms, subdividing the spatial sampling interval of each of the minute holograms, and performing a data interpolation on each new sampling point produced by the subdividing, or which generates a plurality of minute holograms ($g_i'$) by subdividing the spatial sampling interval of the complex amplitude in-line hologram ($J_{OL}$), performing a data interpolation on each new sampling point produced by the subdividing, and dividing the complex amplitude in-line hologram ($J_{OL}$) having a substantially increased number of pixels into the plurality of minute holograms; a spatial modulation section which generates each of object light complex amplitude in-line holograms ($g_i$) corresponding to each of the holograms ($g_i'$) expressing an object light on a hologram plane by performing a spatial heterodyne modulation, to eliminate a component of the in-line spherical wave light (L) using beforehand obtained phase ($\phi_L$) of the in-line spherical wave light (L), on each of the minute holograms ($g_i'$) having the increased number of pixels increased by the division interpolation section; a hologram composing section which generates a synthetic minute hologram ($\Sigma$) by piling up mutually each of the object light complex amplitude in-line holograms ($g_j$) generated by the spatial modulation section; and an image generation section which generates an image on a hologram plane or on an arbitrary position before and behind thereof by deriving a transform function (G) as a result of Fourier-transforming of the synthetic minute hologram (Σ) generated by the hologram composing section, and expanding the object light (O) using the transform function (G) and spatial frequencies (u, v, w) satisfying the dispersion relation of a plane wave.

In the holographic microscope, the image reconstruction section may comprise: a spatial modulation section which generates an object light complex amplitude in-line hologram (g) expressing the object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$); a division section which divides the object light complex amplitude in-line hologram (g) into a plurality of minute holograms ($g_i$); a frequency reduction section which generates each of low frequency minute holograms ($g_i \cdot \exp(-i\phi_i)$) of reduced spatial frequency by performing a spatial heterodyne modulation on each of the minute holograms ($g_i$), respectively, using phase ($\phi_i$) of a parallel light ($L_i$) going to the center of each of the minute holograms ($g_i$) from the focal point of the in-line spherical wave light (L); a Fourier-transform section which generates each divided transform function ($G'_i$) as a result of discrete Fourier-transforming of each of the low frequency minute holograms ($g_i \cdot \exp(-i\phi_i)$), respectively; and an image generation section which generates an image on a hologram plane or on an arbitrary position before and behind thereof by generating each divided transform function ($G'_i \cdot \exp(i\phi_i)$) of increased spatial frequency by performing a spatial heterodyne modulation on each of the divided transform functions ($G'_i$), and expanding the object light (O) using a transform function (G) composed of whole of those divided transform functions ($G'_i \cdot \exp(i\phi_i)$) and spatial frequencies (u, v, w) satisfying the dispersion relation of a plane wave.

In the holographic microscope, the image reconstruction section may comprise: a spatial modulation section which generates an object light complex amplitude in-line hologram (g) expressing the object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$); a division section which divides the object light complex amplitude in-line hologram (g) into a plurality of minute holograms ($g_i$); a Fourier-transform section which obtains each divided transform function ($G_i$) as a result of discrete Fourier-transforming of each of the minute holograms ($g_i$), respectively; and an image generation section which generates an image on a hologram plane or on an arbitrary position before and behind thereof by expanding the object light (O) using a transform function (G) composed of whole of those divided transform functions ($G_i$) and spatial frequencies (u, v, w) satisfying the dispersion relation of a plane wave.

In the holographic microscope, it is preferable that the image recording section uses a pulsed laser as the coherent light source for obtaining a hologram.

In the holographic microscope, the image recording section may generate and record the complex amplitude in-line hologram ($J_{OL}$) in color by obtaining the off-axis hologram ($I_{OR}$) using a plurality of lasers having different wavelength zone mutually, and the image reconstruction section may reconstruct an image in color from the complex amplitude in-line hologram ($J_{OL}$) in color.

Further, the present invention provides a method for recording a hologram image of a microscopic subject, comprising the steps of: obtaining a complex amplitude hologram ($J_{LR}$) as a reference light wave obtaining process by recording an interference fringe pattern ($I_{LR}$) made by an in-line spherical wave light (L) and an off-axis reference light (R) using a photodetector, and performing a spatial frequency filtering on the recorded interference fringe pattern ($I_{LR}$) to obtain the complex amplitude hologram ($J_{LR}$) having recorded the off-axis reference light (R); recording an object light (O) emitted from a microscopic subject by illuminating the microscopic subject with a spherical wave light (L or L2) having the same focal point as that of the in-line spherical wave light (L) as an off-axis hologram ($I_{OR}$) using the off-axis reference light (R) and the photodetector; obtaining a complex amplitude off-axis hologram ($J_{OR}$) as a complex amplitude obtaining process by performing a spatial frequency filtering on the off-axis hologram ($I_{OR}$), and recording a complex amplitude in-line hologram ($J_{OL}$) generated by eliminating a component of the reference light (R) from the complex amplitude off-axis hologram ($J_{OR}$) by dividing data of the complex amplitude off-axis hologram ($J_{OR}$) obtained in the complex amplitude obtaining process by data of the complex amplitude hologram ($J_{LR}$) obtained in the reference light wave obtaining process.

In the method for recording a hologram image of a microscopic subject, it is preferable that the off-axis reference light (R) is a spherical wave.

In the method for recording a hologram image of a microscopic subject, the object light (O) may be a transmitted light through the illuminated microscopic subject.

In the method for recording a hologram image of a microscopic subject, the object light (O) may be a reflected light from the illuminated microscopic subject.

Further, the present invention provides a method for generating a hologram for high-resolution image reconstruction from a complex amplitude in-line hologram ($J_{OL}$) of a microscopic subject obtained using an in-line spherical wave light (L or L2), comprising the steps of: increasing a number of pixels substantially as a pixel number increase process by subdividing the spatial sampling interval of the complex amplitude in-line hologram ($J_{OL}$), and performing a data interpolation on a new sampling point produced by the subdividing; and generating an object light complex amplitude in-line hologram (g) expressing an object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$) having an increased number of pixels increased in the pixel number increase process.

In the method for generating a hologram, it is preferable that the data interpolation is performed with a 3rd equation or a sinc function.

Further, the present invention provides a method for reconstructing an image from a complex amplitude in-line hologram ($J_{OL}$) of a microscopic subject obtained using an in-line spherical wave light (L or L2), comprising the steps of: increasing a number of pixels substantially as a pixel number increase process by subdividing the spatial sampling interval of the complex amplitude in-line hologram ($J_{OL}$), and performing a data interpolation on a new sampling point produced by the subdividing; generating an object light complex amplitude in-line hologram (g) expressing an object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$) having an increased number of pixels increased in the pixel number increase process; and expanding the object light (O) as a plane wave expansion process by using spatial frequencies (u, v, w) satisfying the dispersion relation of a plane wave and a transform function (G) derived as a result of Fourier-transforming of the object light complex amplitude in-line hologram (g), wherein the method generates a light wave (h) on a hologram plane or on an arbitrary position before and behind thereof.

In the method for reconstructing an image, the plane wave expansion process may comprise the steps of: dividing the object light complex amplitude in-line hologram (g) as a division process into a plurality of minute holograms ($g_i$); and generating a synthetic minute hologram ($\Sigma$) as a synthesis process by piling up mutually each of the minute holograms ($g_i$) obtained by the division process, wherein the plane wave expansion process derives the transform function (G) by Fourier-transforming the synthetic minute hologram ($\Sigma$) generated by the synthesis process.

Further, the present invention provides a method for reconstructing an image from a complex amplitude in-line hologram ($J_{OL}$) of a microscopic subject obtained using an in-line spherical wave light (L or L2), comprising the steps of: generating a plurality of minute holograms ($g_i'$) having a substantially increased number of pixels as a division interpolation process, wherein either the minute holograms ($g_i'$) are generated by dividing the complex amplitude in-line hologram ($J_{OL}$) into a plurality of minute holograms, subdividing the spatial sampling interval of each of the minute holograms, and performing a data interpolation on a new sampling point produced by the subdividing, or the minute holograms ($g_i'$) are generated by subdividing the spatial sampling interval of the complex amplitude in-line hologram ($J_{OL}$), performing a data interpolation on each new sampling point produced by the subdividing, and dividing the complex amplitude in-line hologram ($J_{OL}$) having a substantially increased number of pixels into the plurality of minute holograms; generating each of object light complex amplitude in-line holograms ($g_j$) corresponding to each of the holograms ($g_i'$) and expressing the object light on a hologram plane as a spatial modulation process by performing a spatial heterodyne modulation, to eliminate a component of the in-line spherical wave light (L) using beforehand obtained phase ($\phi_L$) of the in-line spherical wave light (L), on each of the minute holograms ($g_i'$) having the increased number of pixels increased in the division interpolation process; generating a synthetic minute hologram ($\Sigma$) as a hologram composing process by piling up mutually each of the object light complex amplitude in-line holograms ($g_j$) generated by the spatial modulation process; and generating an image on a hologram plane or on an arbitrary position before and behind thereof as an image generation process by deriving a transform function (G) as a result of Fourier-transform of the synthetic minute hologram ($\Sigma$) generated by the hologram composing process and expanding the object light (O) using the transform function (G) and spatial frequencies (u, v, w) satisfying the dispersion relation of a plane wave.

In the method for reconstructing an image, it is preferable that the data interpolation is performed with a 3rd equation or a sinc function.

Further, the present invention provides a method for reconstructing an image from a complex amplitude in-line hologram ($J_{OL}$) of a microscopic subject obtained using an in-line spherical wave light (L or L2), comprising the steps of: generating an object light complex amplitude in-line hologram (g) expressing an object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$); dividing the object light complex amplitude in-line hologram (g) into a plurality of minute holograms ($g_i$); generating each of low frequency minute hologram ($g_i \cdot \exp(-i\phi_i)$) of reduced spatial frequency by performing a spatial heterodyne modulation on each of the minute holograms ($g_i$), respectively, using phase ($\phi_i$) of a parallel light ($L_i$) going to the center of each of the minute holograms ($g_i$) from the focal point of the in-line spherical wave light (L or L2); obtaining each divided transform function ($G'_i$) as a result of discrete Fourier-transforming of each of the low frequency minute holograms ($g_i \cdot \exp(-i\phi_i)$), respectively; and generating an image on a hologram plane or on an arbitrary position before and behind thereof by generating each divided transform function ($G'_i \cdot \exp(i\phi_i)$) of increased spatial frequency by performing a spatial heterodyne modulation on each of the divided transform functions ($G'_i$), and expanding the object light (O) using a transform function (G) composed of whole of those divided transform functions ($G'_i \cdot \exp(i\phi_i)$) and spatial frequencies (u, v, w) satisfying the dispersion relation of a plane wave.

Further, the present invention provides a method for reconstructing an image from a complex amplitude in-line hologram ($J_{OL}$) of a microscopic subject obtained using an in-line spherical wave light (L or L2), comprising the steps of: generating an object light complex amplitude in-line hologram (g) expressing an object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$); dividing the object light complex amplitude in-line hologram (g) into a plurality of minute holograms ($g_i$); generating each divided transform function ($G_j$) as a result of discrete Fourier-transforming of each of the minute holograms ($g_i$), respectively; and generating an image on a hologram plane or on an arbitrary position before and behind thereof by expanding the object light (O) using a transform function (G) composed of whole of those divided transform functions ($G_j$) and spatial frequencies (u, v, w) satisfying the dispersion relation of a plane wave.

According to the holographic microscope, the method for recording a hologram image of microscopic subject, the method for generating a hologram for high-resolution image reconstruction, and the method for reconstructing an image of the present invention, since a reference light component is eliminated from an off-axis hologram, which is recorded using a spherical wave light as an illuminating light, by dividing process including processing of spatial heterodyne modulation, it is possible to record a complex amplitude in-line hologram of a large numerical aperture by single shot. Moreover, since no image formation lens is used, no distortion is in an image and therefore image magnification can be performed exceeding the restriction of the resolving power caused by a pixel interval of a photodetector, and since the number of sampling points is reduced by division to a minute hologram and following composition, a computational complexity is reduced and an image can be reconstructed at high speed.

BRIEF DESCRIPTION OF THE DRAWINGS

FIG. 25A is an image focused on a paramecium swimming in a position with a depth of 0.69 mm reconstructed from the hologram in which an image of paramecia swimming in a glass container filled with water is recorded using the microscope, and FIG. 25B is a reconstructed image focused on a paramecium swimming in a position with a depth of 1.49 mm.

FIG. 27 is a conceptual explanatory diagram showing the method for reconstructing an image comparing with a reconstruction method including a pixel number increase process.

MODE FOR CARRYING OUT THE INVENTION

Hereafter a method for recording a hologram image of a microscopic subject, a method for generating a hologram for high-resolution image reconstruction, a method for reconstructing an image, and a holographic microscope based on an off-axis holography using a spherical wave light as an illuminating light according to embodiments of the present invention are described with reference to drawings.

(The Method for Recording a Hologram Image of a Microscopic Subject)

Figure 1:
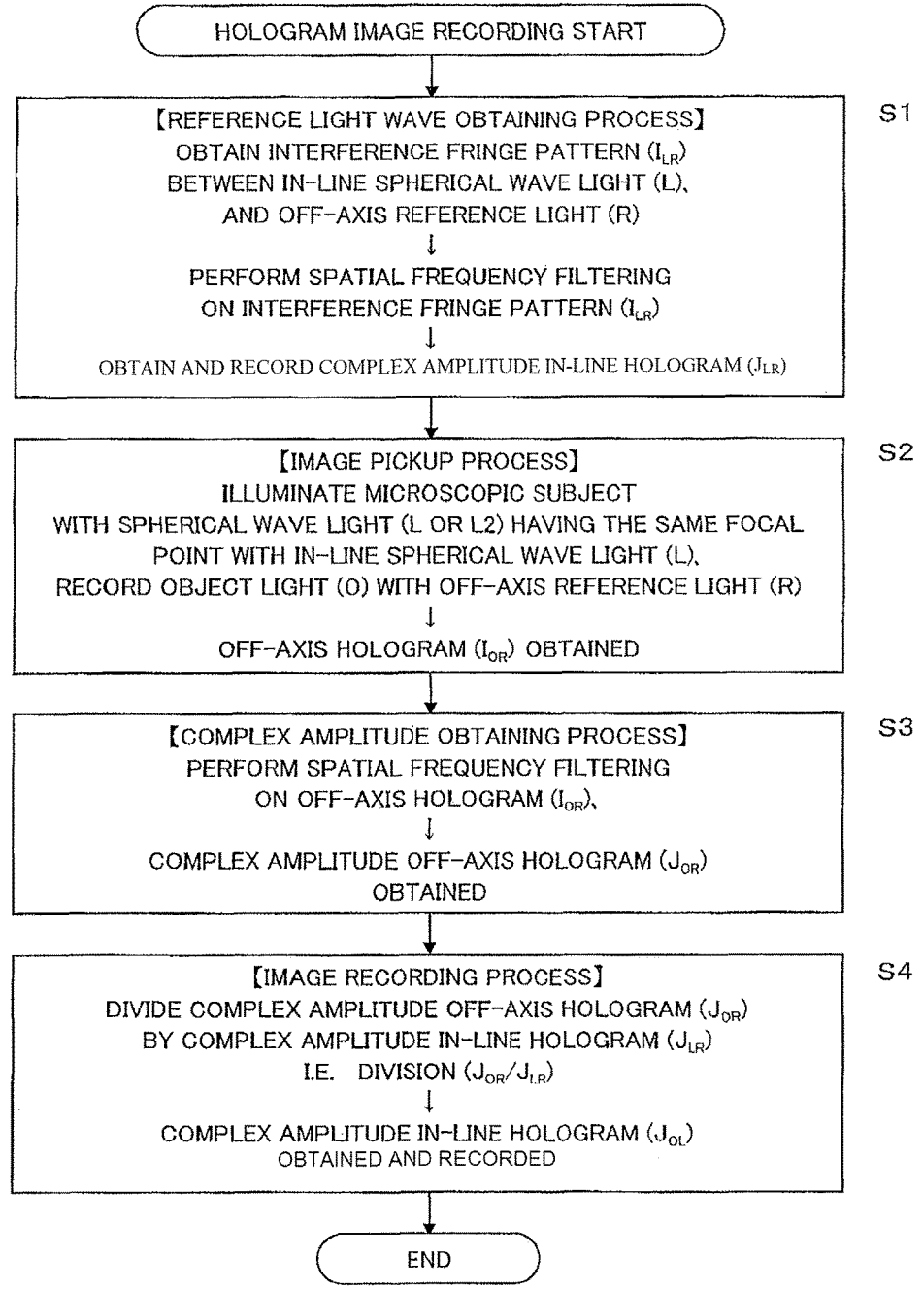
FIG. 1 is a flowchart showing a method for recording a hologram image of a microscopic subject according to an embodiment of the present invention.
Figure 2:
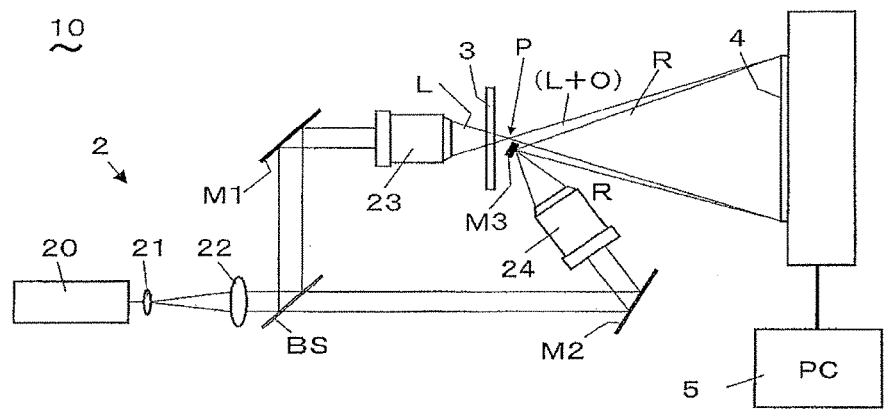
FIG. 2 is a schematic block diagram of a hologram image recording device for applying the recording method to a transparent microscopic subject.
Figure 3A:
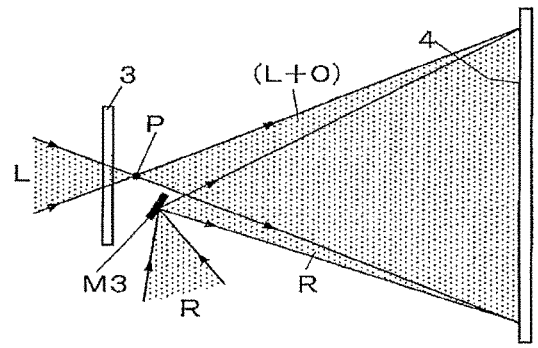
FIG. 3A is a side elevation showing a situation of hologram image recording by the device about lights impinging on a photodetector.
Figure 3B:
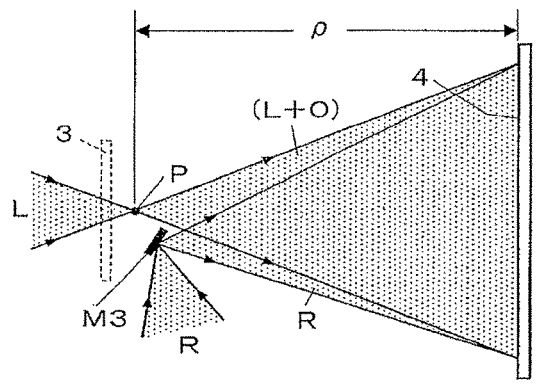
FIG. 3B is a side elevation showing a situation of reference light recording performed during the image recording about lights impinging on the photodetector.
Figure 4:
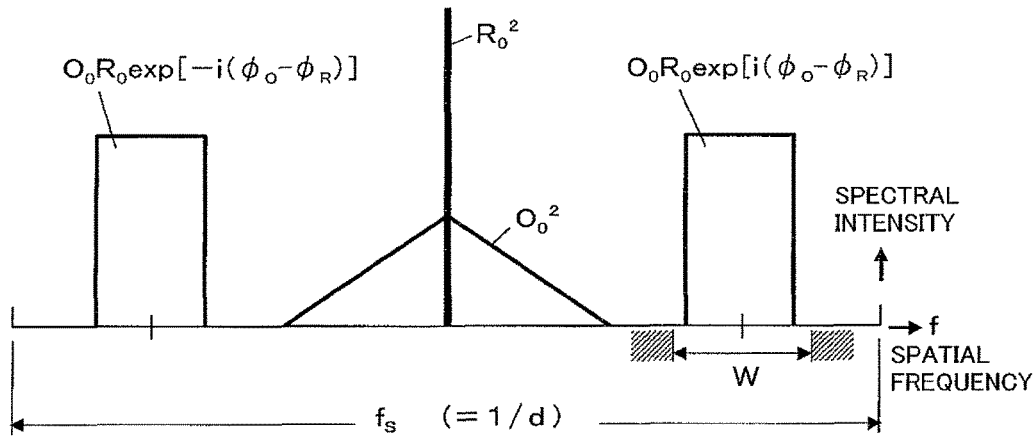
FIG. 4 is a figure of a spatial frequency spectrum for explaining spatial frequency filtering performed during the recording of an object light in the recording method.
Figure 5:
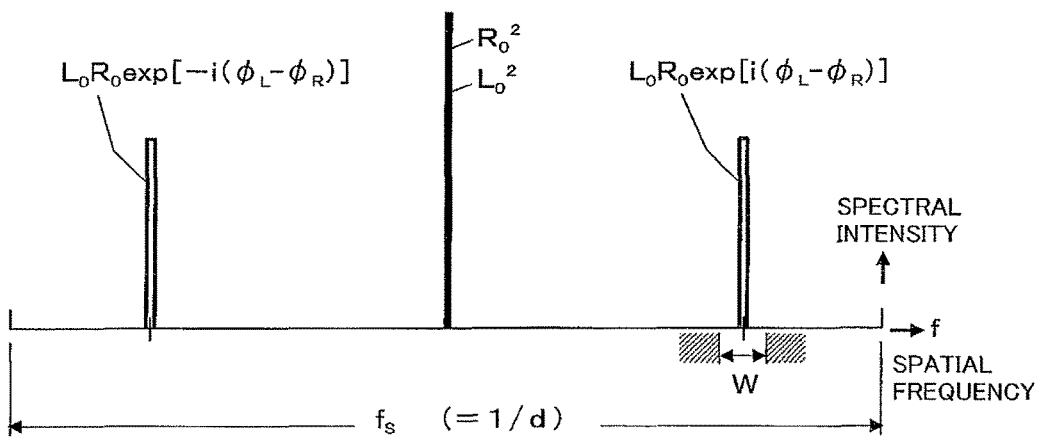
FIG. 5 is a figure of a spatial frequency spectrum for explaining spatial frequency filtering performed during the recording of a reference light in the recording method.
Figure 6:
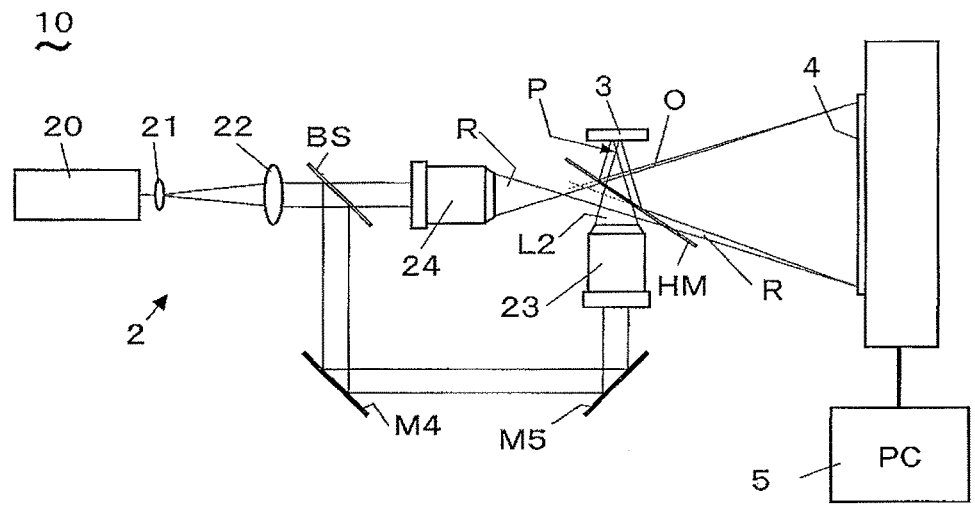
FIG. 6 is a schematic block diagram of a hologram image recording device for applying the recording method to an opaque microscopic subject.
Figure 7A:
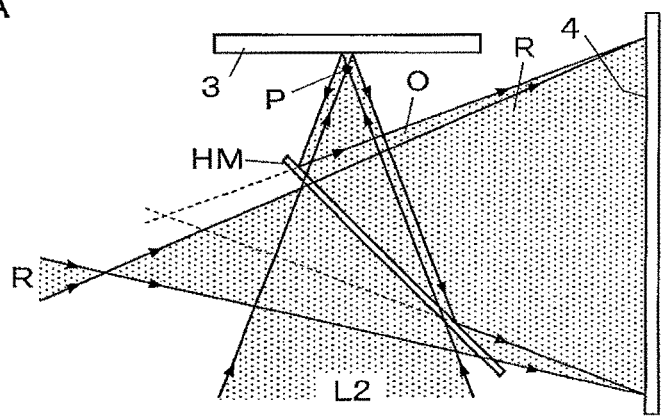
FIG. 7A is a side elevation showing a situation of hologram image recording by the device about the lights impinging on a photodetector.
Figure 7B:
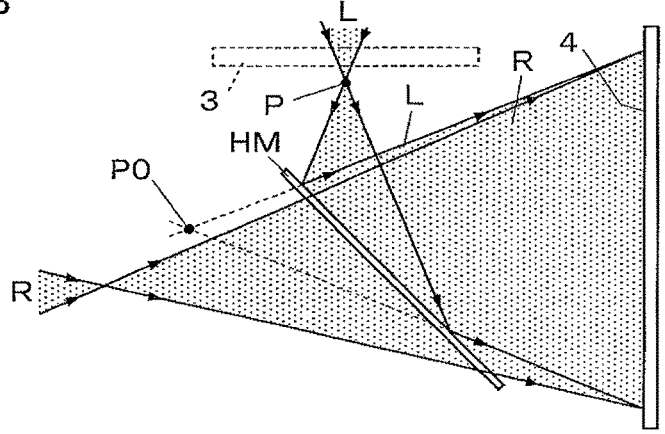
FIG. 7B is a side elevation showing a situation of reference light recording performed during the image recording about lights impinging on the photodetector.

FIGS. 1 to 7B show the method for recording a hologram image of a microscopic subject (it is also called the recording method), among these figures, FIGS. 2, 3A, and 3B show the case where the microscopic subject is transparent, and FIGS. 6, 7A, and 7B show the case where the microscopic subject reflects light. As shown in FIG. 1, this hologram image recording method comprises a reference light wave obtaining process (S1) recording information on a reference light R, an image pickup process (S2) recording information on an object light O, a complex amplitude obtaining process (S3), and an image recording process (S4) recording a complex amplitude in-line hologram generated by eliminating the information on the reference light R from the information on the object light O. Here, constitution of a device for carrying out this image recording method is explained, and then each process of image recording is explained in detail after that. In addition, in this specification, the term "wave front" is used also as a meaning of "light wave" which arrived at a certain plane in addition to the meaning of "equi-phase surface".

The recording device 10 used for carrying out this recording method, as shown in FIG. 2, has a laser 20 as a light source, an optical system 2 which propagates lights, a photodetector 4 which receives a light from a transparent microscopic subject 3 together with a reference light and records light intensity thereof, and a computer 5 which processes and memorizes signals of the light intensity. Note that "microscopic" in the microscopic subject 3 should be recognized that it does not mean the subject itself is small but the object region for image recording is small. The optical system 2 is equipped with lenses 21 and 22 which enlarge the diameter of the light from the laser 20, a beam splitter BS which branches the enlarged light, mirrors M1 and M2 which change direction of each light, and condenser lenses 23 and 24 which condenses the light from each of the mirrors M1 and M2. Further, the optical system 2 is equipped with a mirror M3 beyond the condenser lens 24. The photodetector 4 is CCD, for example. The light going via the mirror M1 and the condenser lens 23 is changed into a spherical wave by the condenser lens 23, and floods the photodetector 4 as an in-line spherical wave light L. The microscopic subject 3 is placed between the condenser lens 23 and the photodetector 4, and is illuminated from behind. A focal point P (the central point of a spherical wave) of the in-line spherical wave light L exists between the condenser lens 23 and the photodetector 4. In the example of this figure, the focal point P is set at a position immediately after the penetration through the microscopic subject 3. In addition, although the position of the focal point P can be set at the position of the microscopic subject 3 or at the arbitrary positions before and behind that, it is necessary to keep the illuminated area not too much large. The reason is, for example, to keep spectra from overlapping as shown in below-mentioned FIG. 4. When the spectra do not overlap, spatial frequency filtering becomes possible.

When the microscopic subject 3 is irradiated with an in-line spherical wave light L as a illumination light, an object light O is received by the photodetector 4. A light propagated via the mirror M2, the condenser lens 24, and the mirror M3 is changed into a spherical wave having a focus point near the above-mentioned focal point P by the condenser lens 24, and floods the photodetector 4 as an off-axis reference light R. FIGS. 3A and 3B show the substantial part near the photodetector 4, and FIG. 3B shows the situation where the microscopic subject 3 is not placed. Moreover, the distance ρ between the focal point P and the photodetector 4 shown in FIG. 3B is a quantity which is determined by the setting of the optical system 2, and is used for derivation of phase $\phi_L$ of the in-line spherical wave light L (mentioned later).

Here, the image recording is explained using mathematical expression. An illuminating light, a reference light, and an object light, etc. involve the hologram image recording of a microscopic subject. Then, using a coordinate (x, y) system on a surface of the photodetector 4, the object light O(x, y, t), the off-axis reference light R(x, y, t), and the in-line spherical wave light L(x, y, t) are denoted in a general form by the following equations (1), (2), and (3), respectively. Such lights are the mutually coherent lights of angular frequency ω. The coefficients, the arguments, the subscripts, etc. in each equation are recognized to be in a general expression and meaning. Moreover, in each following equation, an explicit note of the coordinate (x, y), etc. are omitted appropriately.

$$O(x,y,t)=O_0(x,y)\exp[i(\phi_O(x,y)-\omega t)] \quad (1)$$

$$R(x,y,t)=R_0(x,y)\exp[i(\phi_R(x,y)-\omega t)] \quad (2)$$

$$L(x,y,t)=L_0(x,y)\exp[i(\phi_L(x,y)-\omega t)] \quad (3)$$

Light intensity $I_{OR}(x, y)$ composed of O(x, y, t) and R(x, y, t) of above equations, and light intensity $I_{LR}(x, y)$ composed of L(x, y, t) and R(x, y, t) of above equations are denoted by following equations (4) and (5), respectively.

$$I_{OR}(x,y)=O_0^2+R_0^2+O_0R_0\exp[i(\phi_O-\phi_R)]+O_0R_0\exp[-i(\phi_O-\phi_R)] \quad (4)$$

$$I_{LR}(x,y)=L_0^2+R_0^2+L_0R_0\exp[i(\phi_L-\phi_R)]+L_0R_0\exp[-i(\phi_L-\phi_R)] \quad (5)$$

In above equations (4) and (5), the 1st term of the right hand side is the light intensity component of the object light O or the in-line spherical wave light L, and the 2nd term is the light intensity component of the off-axis reference light R. Moreover, the 3rd term and the 4th term of each equation denote a direct image component and a conjugate image component, respectively, which are made as the results that the object light O or the in-line spherical wave light L is modulated by the off-axis reference light R.

When only the 3rd term of equation (4) and (5) are extracted by using spatial frequency filtering, a complex amplitude hologram $J_{OR}$ in which the object light is recorded, and a complex amplitude hologram $J_{LR}$ in which the in-line spherical wave light is recorded are obtained as shown in following equations (6) and (7), respectively.

$$J_{OR}(x,y)=O_0(x,y)R_0(x,y)\exp[i(\phi_O(x,y)-\phi_R(x,y))] \quad (6)$$

$$J_{LR}(x,y)=L_0(x,y)R_0(x,y)\exp[i(\phi_L(x,y)-\phi_R(x,y))] \quad (7)$$

Spatial frequency filtering is performed by Fourier-transform which changes each of equations (4) and (5) into spatial frequency space expression, filtering by the band pass filter W, and subsequent inverse Fourier-transform. FIG. 4 shows the situation of spatial frequency filtering applied to $I_{OR}$ (x, y), and FIG. 5 shows the situation of spatial frequency filtering applied to $I_{LR}$ (x, y). If a spherical wave is used as the off-axis reference light R, in spatial frequency space, it will become easy to separate a direct image component from the light intensity component and a conjugate image component, but even if the reference light R is not necessarily a spherical wave, a direct image component is separable. Note that supposing two-dimensional array of pixels (picture elements) in the photodetector 4 is of pixel interval (pitch) d, the recordable highest spatial frequency band width of a hologram using the photodetector 4 becomes a spatial frequency $f_s=1/d$.

By a dividing process, that is, by dividing above equation (6) by above equation (7), the amplitude $R_0$ and the phase $\phi_R$ of the off-axis reference light R can be eliminated from equation (6), and a complex amplitude in-line hologram $J_{OL}$ according to the in-line spherical wave light L is obtained as following equation (8).

$$J_{OL}(x,y)=(O_0(x,y)/L_0(x,y))\exp[i(\phi_O(x,y)-\phi_L(x,y))] \quad (8)$$

Next, the relation of each above equation and each process of the image recording in FIG. 1 is described. The reference light wave obtaining process (S1) is a process for obtaining and recording the complex amplitude hologram $J_{LR}$ of above equation (7). As shown in FIG. 3B, specifically, in the situation where the microscopic subject 3 is not arranged, interference fringe pattern $I_{LR}$ made by the in-line spherical wave light L and the off-axis reference light R is recorded with the photodetector 4. Note that although the description is made under the assumption that the off-axis reference light R used is a spherical wave, generally, it is not limited to a spherical wave but a light wave of an arbitrary wave front can be used. The recorded interference fringe pattern $I_{LR}$ is applied spatial frequency filtering thereto by the computer 5, and made into the complex amplitude hologram $J_{LR}$ in which the off-axis reference light R is recorded.

The image pickup process (S2) is a process for recording the off-axis hologram $I_{OR}$ of above equation (4). As shown in FIG. 3A, specifically, in the situation where the microscopic subject 3 is arranged, the microscopic subject 3 is illuminated from its rear-face side using the in-line spherical wave light L as an illuminating light, and the object light O emitted from the front-face side of the microscopic subject 3 is recorded with the photodetector 4 as the off-axis hologram $I_{OR}$ using the off-axis reference light R.

The complex amplitude obtaining process (S3) is a process for applying spatial frequency filtering to the off-axis hologram $I_{OR}$ of above equation (4), and obtaining the complex amplitude off-axis hologram $J_{OR}$ of above equation (6). This process is performed by software processing in the computer 5.

The image recording process (S4) is a process for generating and recording the complex amplitude in-line hologram $J_{OL}$ of above equation (8). The equation (6) is divided by equation (7) by software processing in the computer 5, that is, specifically, it is carried out by carrying out the dividing process of the data of the complex amplitude off-axis hologram ($J_{OR}$) with the data of the complex amplitude hologram ($J_{LR}$) obtained in the reference light wave obtaining process. This division process is a process of spatial heterodyne modulation, a process to the intensity, and also a process which eliminates the reference light R component (both the intensity and the phase) from the complex amplitude off-axis hologram $J_{OR}$. This complex amplitude in-line hologram $J_{OL}$ is the hologram image finally recorded by the method for recording a hologram image of a microscopic subject. As can be seen from the above description, note that since the information ($J_{LR}$) on the reference light R recorded in the reference light wave obtaining process (S1) is used in the image recording process (S4), it is only necessary to perform the reference light wave obtaining process (S1) before the image recording process (S4). That is, the reference light wave obtaining process (S1), and both of the image pickup process (S2) and the complex amplitude obtaining process (S3) can replace turn mutually.

Next, with reference to FIGS. 6, 7A and 7B, the method for recording a hologram image of microscopic subject is described for the case that the object light is a reflected light from the microscopic subject, for example, for the case that a light does not penetrate the microscopic subject. In this case, since the illumination light illuminates the microscopic subject so that the reflected light may turn into the object light O, the in-line spherical wave light L(x, y, t) can not be used as the illumination light as it is. However, the equations (1) to (8) mentioned above can be used as it is also in this case. The recording device 10 for carrying out this recording method, as shown in FIG. 6, similar to the recording device 10 shown in FIG. 2, comprises a laser 20, an optical system 2, a photodetector 4 which receives a light from a microscopic subject 3 together with a reference light and records light intensity thereof, and a computer 5 which processes and memorizes signals of the light intensity. The optical system 2 is equipped with lenses 21 and 22 for enlarging diameters, a beam splitter BS which branches the enlarged light, mirrors M4 and M5 which change direction of one light, a condenser lens 23 which condenses the light from the mirror M5, and a condenser lens 24 which condenses another light. Further, the optical system 2 is equipped with a half mirror HM beyond the condenser lens 23. The photodetector 4 is CCD, for example. The condenser lens 23 is arranged so that its optical axis becomes parallel to the light receiving surface of the photodetector 4, and the condenser lens 24 is arranged so that its optical axis becomes vertical to the light receiving surface of the photodetector 4.

The one light branched by the beam splitter BS propagates via the mirrors M4 and M5 and the condenser lens 23, is changed into a spherical wave, and floods the microscopic subject 3 arranged in front of the half mirror HM as an in-line spherical wave light L2. The microscopic subject 3 is illuminated by the in-line spherical wave light L2, and emits an object light O. The object light O is reflected by the half mirror HM towards the photodetector 4, and received by the photodetector 4. Although the focal point P of the in-line spherical wave light L2 (central point of a spherical wave) is set to the nearest front side of the microscopic subject 3, the position in particular may not be limited but may be a back side of the microscopic subject 3. The other light which goes through the splitter BS straight on propagates towards the photodetector 4 as the off-axis reference light R after focused near the mirror point P0 about the half mirror HM of the focal point P (refer to FIG. 7B).

FIGS. 7A and 7B show the substantial part near the photodetector 4, and FIG. 7B shows the situation where the microscopic subject 3 is not placed. Moreover, in FIG. 7B, an in-line spherical wave lights L different from the in-line spherical wave light L2 for illumination light are used in order to obtain light intensity $I_{LR}$ (x, y) of the composed light of equation (5). The in-line spherical wave light L is a spherical wave light which has the same focal point P as the in-line spherical wave light L2, and these lights L and L2 differ from each other in that the paths lead to the focal point P are reverse mutually. However, these lights L and L2 are the same in that they are reflected by the half mirror HM towards the photodetector 4 and received by the photodetector 4.

According to this recording method, a complex amplitude in-line hologram $J_{OR}$ can be obtained easily from a complex amplitude hologram $J_{OR}$ having recorded the object light O, if a complex amplitude hologram $J_{LR}$ have been obtained from an off-axis hologram $I_{LR}$ in which an in-line spherical wave light L have been recorded. Since no image formation lens is used for the complex amplitude in-line hologram $J_{OL}$, no distortion resulting from the lens is included in the recorded image, therefore the fault that distortion actualizes does not occur when the image is reconstructed and magnified. That is, the complex amplitude in-line hologram $J_{OL}$ can be used for distortionless image reconstruction. According to this recording method, the complex amplitude in-line hologram $J_{OL}$ can be obtained and recorded by two single shot, that is, one single shot for recording the interference fringe pattern $I_{LR}$, and one single shot for recording the off-axis hologram $I_{OR}$. Moreover, what is necessary is to obtain the complex amplitude hologram $J_{LR}$ only once, and therefore the complex amplitude in-line hologram $J_{OL}$ can be recorded substantially by one single shot. Moreover, this recording method uses an in-line spherical wave light L as an illumination light, and also no image formation lens is used. Therefore, an image of a large numerical aperture (NA) can be recorded. Moreover, this recording method can be applied to the object light O of any one of the transmitted light through the illuminated microscopic subject 3 and the reflected light from the illuminated microscopic subject 3.

(The Method for Generating a Hologram for High-Resolution Image Reconstruction)

Figure 8:
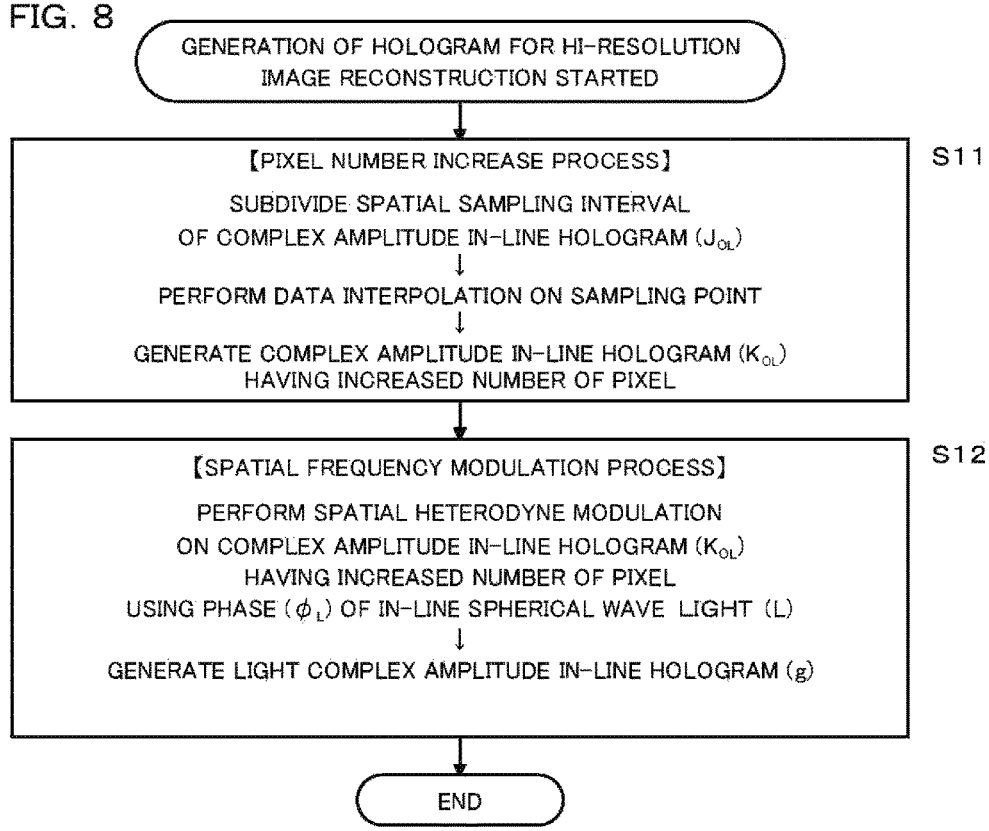
FIG. 8 is a flowchart showing a method for generating a hologram for high-resolution image reconstruction according to an embodiment of the present invention.
Figure 9A:
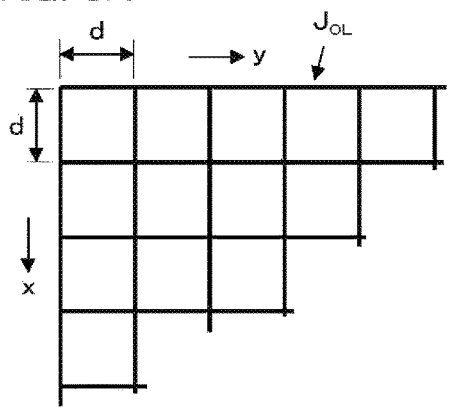
FIG. 9A is a part drawing of a hologram for a processing object in the generating method.
Figure 9B:
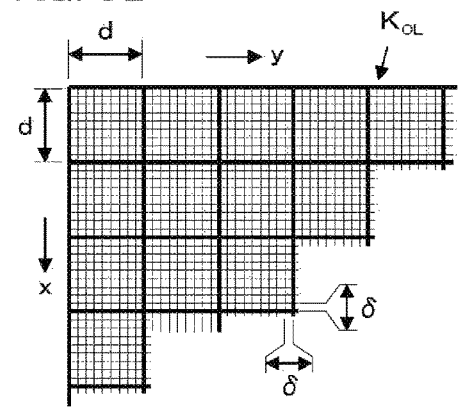
FIG. 9B is a part drawing of a hologram showing a situation of spatial sampling points increasing in the hologram.

FIGS. 8, 9A, and 9B show the method for generating a hologram for high-resolution image reconstruction. The complex amplitude in-line hologram $J_{OL}$ recorded by the above-mentioned method for recording a hologram image of a microscopic subject is obtained using an in-line spherical wave light L or L2, without using an image formation lens. Therefore, no distortion occurs, even if the image is magnified by subdividing the spatial sampling interval down to be small near the light wavelength. This method for generating a hologram for high-resolution image reconstruction, as shown in FIG. 8, comprises a pixel number increase process (S11) for increasing the pixel number substantially, and a spatial modulation process (S12) for generating an object light complex amplitude in-line hologram g from which the component of the in-line spherical wave light L is eliminated.

In the pixel number increase process (S11), firstly, as shown in FIGS. 9A and 9B, the complex amplitude in-line hologram $J_{OL}$ is assumed to have a spatial sampling interval d corresponding to the pixel interval d of the photodetector 4, and the spatial sampling interval d is subdivided and made to be a spatial sampling interval $\delta$. Secondly, a data interpolation is performed on the new sampling point produced by the subdivision, and thus the pixel number is increased substantially. As the data interpolation method, a data interpolation using the 3rd equation or a data interpolation using a sinc function, commonly known in image processing, can be used. If the sinc interpolation is used as the data interpolation, compared with the interpolation using the 3rd equation, numerical computation will take time, but a more proper result can be obtained. The resultant, which has the increased number of pixels by the data interpolation to the complex amplitude in-line hologram $J_{OL}$, is defined as a complex amplitude in-line hologram $K_{OL}$. An equation denoting the complex amplitude in-line hologram $K_{OL}$ is the above equation (8) replaced $J_{OL}$ with $K_{OL}$. Note that the pixel interval d of the photodetector 4 may differ mutually in the arranging directions (the x y directions) of the pixels, and the spatial sampling interval $\delta$ may differ mutually in the arranging directions of the pixels.

In the spatial modulation process (S12), a spatial heterodyne modulation is performed on the complex amplitude in-line hologram $K_{OL}$, which has the increased number of pixels according to the pixel number increase process (S11), using phase $\phi_L$ of the in-line spherical wave light L obtained beforehand. In the case where the microscopic subject is transparent, the phase $\phi_L(x,y)$ of the in-line spherical wave light L on the light receiving surface of the photodetector 4 can be easily obtained in a function form using the distance $\rho$ shown in FIG. 3B mentioned above and the fact that the light is spherical wave. Moreover, in the case where the microscopic subject reflects light, the phase $\phi_L(x, y)$ of the in-line spherical wave light L, can be easily obtained in a function form based on the optical path from the focal point P to the light receiving surface shown in FIG. 7B mentioned above. The spatial heterodyne modulation using the phase $\phi_L$ is performed by multiplying equation (8) (however, equation in which $J_{OL}$ is replaced with $K_{OL}$) mentioned above by $\exp(i\phi_L(x, y))$. An object light complex amplitude in-line hologram g(x, y) shown in following equation (9) is obtained as a result of the spatial heterodyne modulation.

$$g(x,y)=(O_0(x,y)/L_0(x,y))\exp(i\phi_O(x,y)) \qquad (9)$$

This object light complex amplitude in-line hologram g(x, y) expresses the object light wave front on the light receiving surface of the photodetector 4, i.e., a light wave distribution of the object light at z=0, when the z-coordinate axis is set to the normal direction to the light receiving surface and the position of the light receiving surface is set to z=0. This object light complex amplitude in-line hologram g(x, y), compared with a hologram not processed by the pixel number increase process (S11), can reconstruct an image magnified without distortion (i.e., an image of improved resolving power) and with a magnification d/$\delta$ based on the ratio of the above-mentioned pixel interval d and the spatial sampling interval $\delta$.

Here, the spatial sampling interval $\delta$ is described. A spatial frequency band can be made narrower by recording a hologram with a large numerical aperture using a spherical wave illumination light and a spherical wave reference light than that in the case where a spherical wave illumination light and an aspheric wave reference light are used. Moreover, the spatial frequency band of the object light complex amplitude in-line hologram g(x, y) for the object light becomes large in a large numerical aperture. The spatial change of the object light complex amplitude in-line hologram g (x, y) becomes larger as departing from the hologram center and becomes maximum at the end of the hologram. The maximum spatial frequency of the object light complex amplitude in-line hologram g(x, y) is denoted by $1/(\lambda K)$ by using a light wavelength $\lambda$ and a parameter $K=\mathrm{sqr}(1+(1/NA)^2)$, wherein the numerical aperture of the hologram is set to NA, and sqr(*) is defined as square root of *. And, it is necessary to set the spatial sampling interval $\delta$ as a value equal to or less than $\lambda K/2$ in order to denote this wide band object light complex amplitude in-line hologram g(x, y) by a discrete value. Moreover, since the narrow band complex amplitude in-line hologram $J_{OL}$ changes slowly along the pixel interval d of the photodetector 4, a high speed calculation using the 3rd equation is possible in a data interpolation.

(The Method for Reconstructing an Image)

Figure 10:
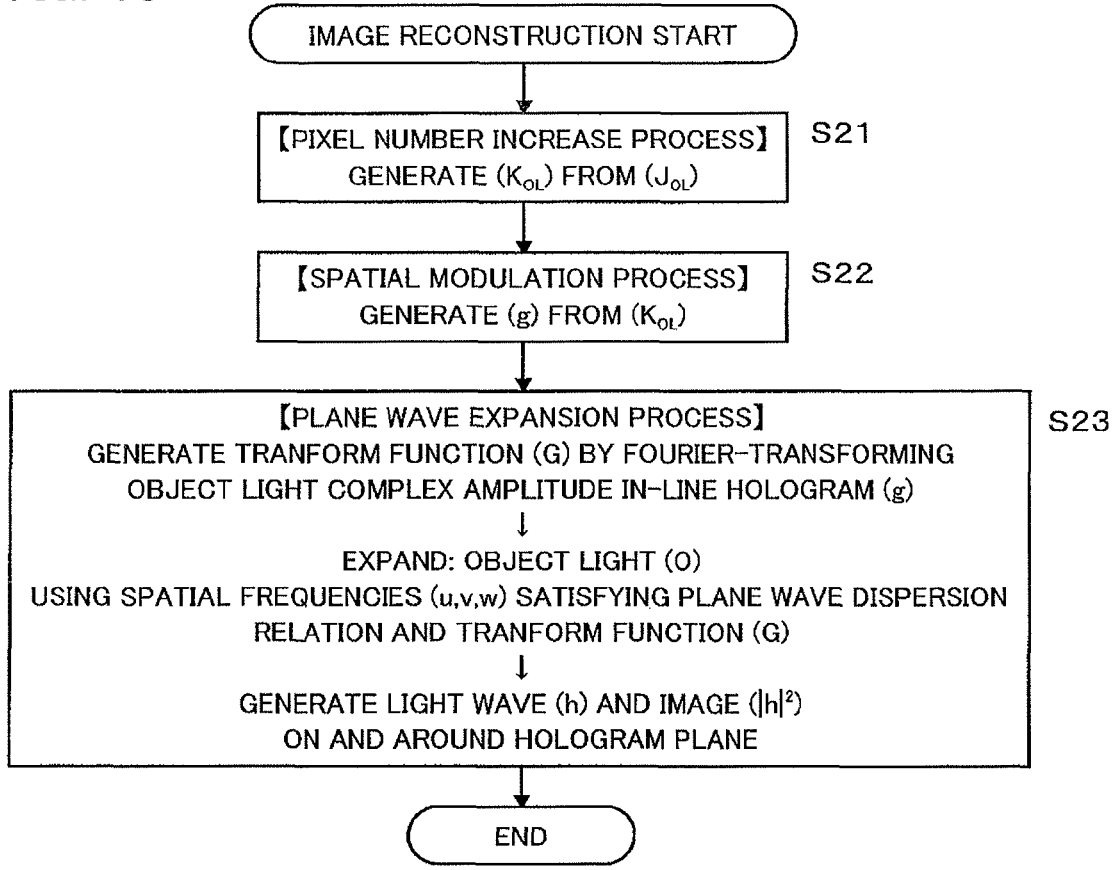
FIG. 10 is a flowchart showing a method for reconstructing an image according to an embodiment of the present invention.

FIG. 10 shows the method for reconstructing an image. This image reconstruction method is a method for reconstructing an image from a complex amplitude in-line hologram $J_{OL}$ recorded by the method for recording a hologram image of a microscopic subject mentioned above. This image reconstruction method, as shown in FIG. 10, performs a plane wave expansion process (S23) after performing a pixel number increase process (S21) and a spatial modulation process (S22). The pixel number increase process (S21) and the spatial modulation process (S22) are processes equivalent to the above-mentioned pixel number increase process (S11) and the spatial modulation process (S12), respectively.

The plane wave expansion process (S23) is a process for performing a plane wave expansion of the object light O using not only spatial frequencies (u, v, w) which satisfy the dispersion relation of a plane wave but also a transform function G which is the result of Fourier-transforming of the object light complex amplitude in-line hologram g. There are plane waves as exact solutions of Helmholtz equation for electromagnetic waves. An accurate light wave front can be reconstructed by expanding the hologram having recorded the object light O using plane waves which are exact solutions. Then, firstly, g(x, y) of above equation (9) is Fourier-transformed, and a transform function G at z=0 is obtained as following equation (10). This transform function G is a spatial frequency spectrum of the object light O.

$$G(u, v) = \iint g(x, y)\exp[-i2\pi(ux+vy)]dxdy \quad (10)$$

Next, a light wave h(x, y) which is the object light O on the x-y plane at z=$z_0$, as following equation (11), can be obtained using the transform function G and the spatial frequencies (u, v, w) which satisfy the dispersion relation of a plane wave. That is, the light wave h(x, y) is obtained by superposing the plane waves with weighting of the transform function G which is the spatial frequency spectrum of the object light O (this is called as a plane wave expansion of the object light O). Moreover, $z_0$ can be not only a plus value but also any value. Note that u and v in (u, v, w) are the spatial frequency in the x and y direction, respectively. Moreover, the spatial frequency w in the z direction can be obtained from the dispersion relation of a plane wave as following equation (12). λ in equation (12) is a light wavelength.

$$h(x, y) = \iint G(u, v)\exp[i2\pi w(u, v)z_0] \exp[i2\pi(ux+vy)] \, dudv \quad (11)$$

$$w(u, v) = \sqrt{1/\lambda^2 - u^2 - v^2} \quad (12)$$

The light wave h(x, y) of above equation (11) is a exact solution of Helmholtz equation, and satisfies the boundary condition g(x, y) on the light receiving surface of the photodetector 4. A distortionless high-resolution image using the plane wave expansion can be observed by displaying the light wave h(x, y) on an electronic display with intensity of light for every pixel obtained by the squared absolute value $|h(x, y)|^2$. By changing the value of $z_0$ in equation (11), an image at an arbitrary position (focusing position) in the recorded three-dimensional image can be displayed. Moreover, the image has turned into an image magnified with a magnification d/δ without distortion, i.e., an image of improved resolving power. The size (absolute size) of the image is measured with reference to the pixel interval d.

(Another Method for Reconstructing an Image)

FIGS. 11A to 14 show another image reconstruction method which can reduce computational complexity. As mentioned above, although a high resolution object light can be reconstructed from a complex amplitude in-line hologram $J_{OL}$, a spatial sampling interval is narrowed down to a light wavelength in order to reconstruct a high-resolution image using plane wave expansion. At this time, it becomes necessary to limit the number of sampling data within a feasible range where numerical computation is possible under appropriate calculation time, for example, using fast Fourier-transform (FFT). On the contrary, if shortening of calculation time is possible, the number of sampling data can be increased and a distortionless image of more high-resolution can be reconstructed. By the way, for the different data sets having different frequency bands mutually, computation is possible in the state that they are added mutually according to the superposition principle of waves. That is, each information recorded in a different frequency band is retained without losing even if they are piled up spatially, and using this fact, it is possible to generate a wide band "minute hologram" by piling up wide band holograms. Moreover, each of the complex amplitude in-line hologram $J_{OL}$ and the object light complex amplitude in-line hologram g (x, y) carries the information for reconstructing an image in each of its divided segments.

Figure 11A:
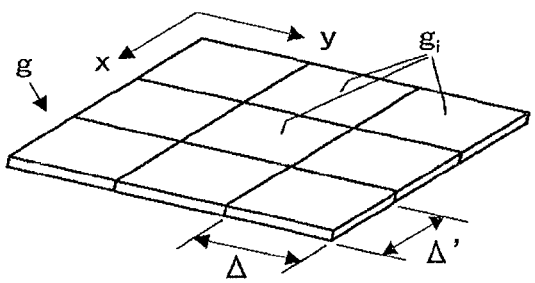
FIG. 11A is a conceptual diagram of a hologram for reconstruction to which another method for reconstructing an image according to an embodiment of the present invention is applied.
Figure 11B:
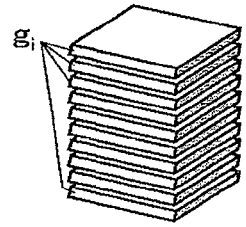
FIG. 11B is a conceptual diagram showing the hologram divided and piled on each other.
Figure 11C:
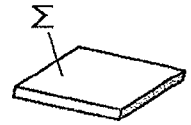
FIG. 11C is a conceptual diagram of a hologram composed of the holograms of FIG. 11B.
Figure 12:
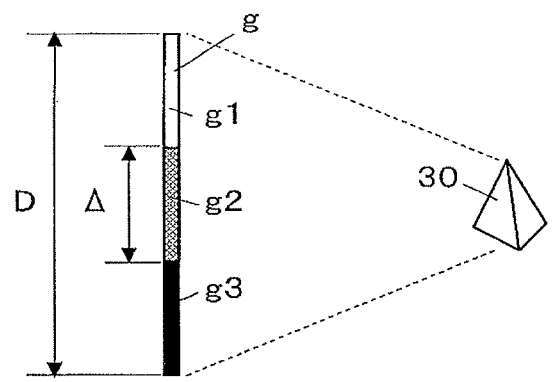
FIG. 12 is a conceptual diagram of a reconstructed image and a single hologram for reconstruction to which the reconstructing method is applied.
Figure 13:
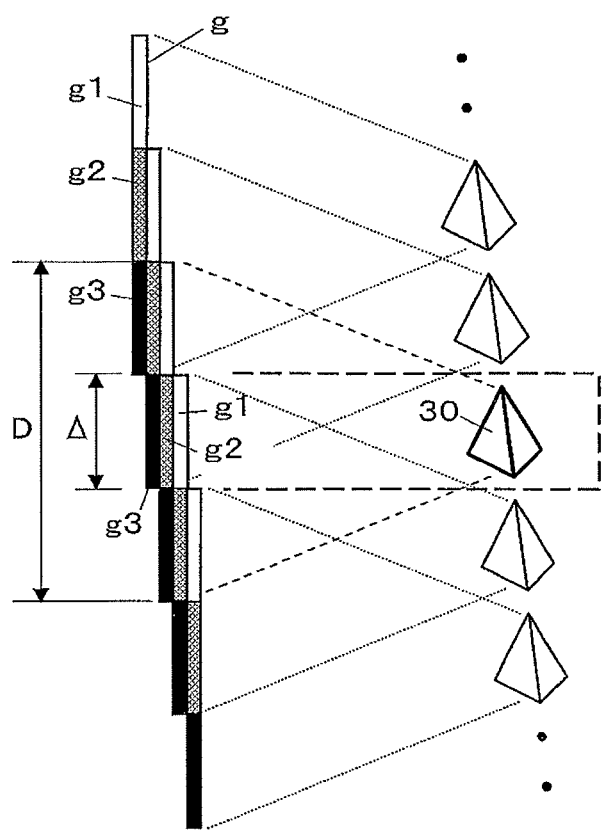
FIG. 13 is a conceptual diagram showing a plurality of holograms for reconstruction and a plurality of reconstructed images shown to explain the principle of the reconstructing method.

Then, as shown in FIG. 11A, the object light complex amplitude in-line hologram g(x, y) is divided into a plurality of minute holograms $g_i$ of width Δ and Δ', and as shown in FIGS. 11B and 11C, each minute hologram $g_i$ is piled up mutually and a synthetic minute hologram Σ is generated. If the calculation based on the above-mentioned equation (10), (11), and (12) is performed to this synthetic minute hologram Σ, shortening of calculation time will be achieved. FIG. 12 shows a situation that the object light complex amplitude in-line hologram g of width D (x, y) is divided into minute holograms g1, g2, and g3 of width Δ. A reconstructed image 30 is reconstructed using one hologram, i.e., the object light complex amplitude in-line hologram g(x, y). The holograms made by piling up the object light complex amplitude in-line holograms g(x, y) shifting by each width Δ, as shown in FIG. 13, become a hologram with a period of width Δ. By using this hologram, many same reconstructed images 30 can be reconstructed for every interval of width Δ. The original number of calculation points is compressed into the product of the original number and the reciprocal of the number of piled-up minute holograms $g_i$. That is, the computational complexity becomes 1/n when n holograms are piled up.

Figure 14:
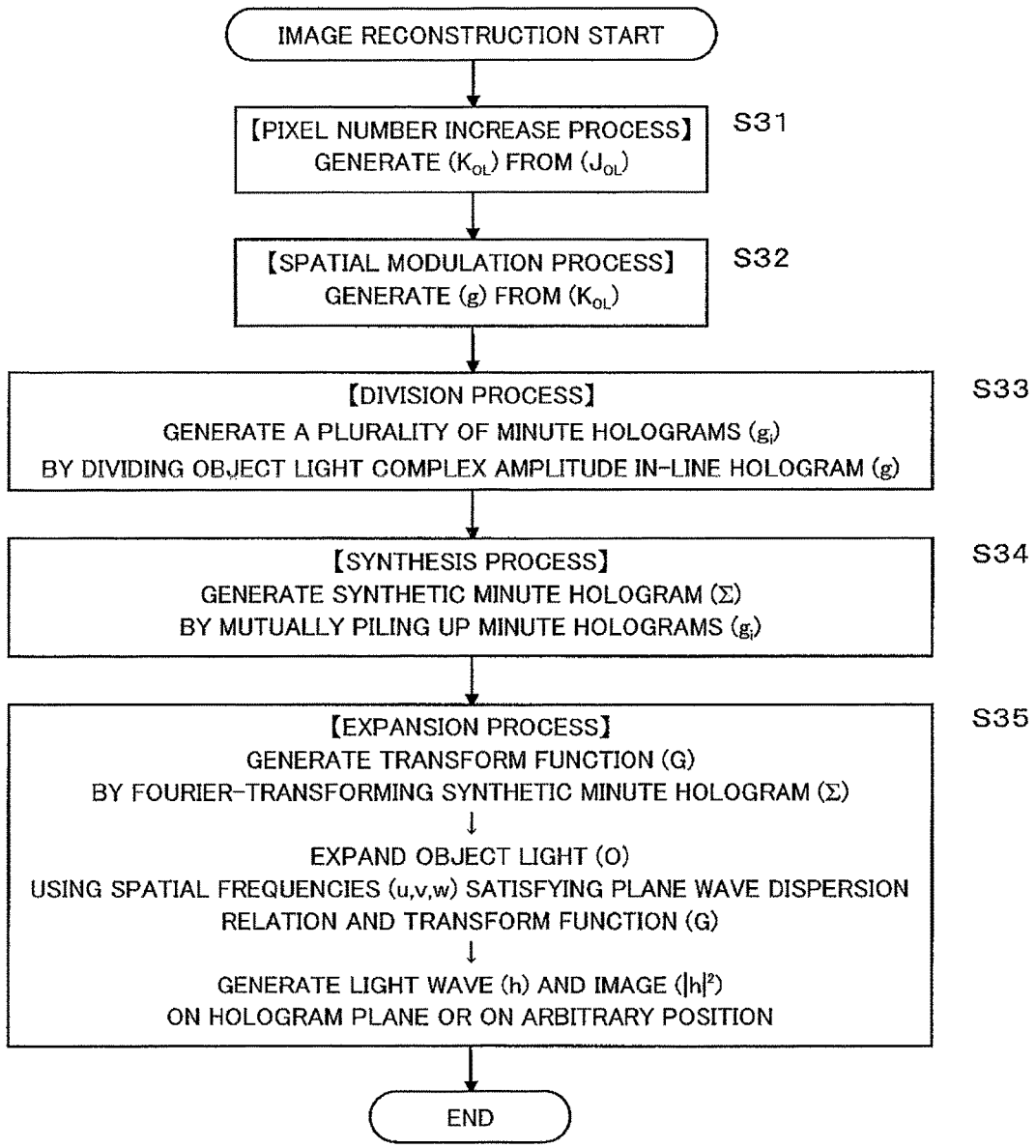
FIG. 14 is a flowchart showing the reconstructing method.

FIG. 14 shows the image reconstruction method based on such processing. A pixel number increase process (S31) and a spatial modulation process (S32) in this image reconstruction method are processes equivalent to the pixel number increase process and the spatial modulation process shown in FIG. 8 and FIG. 10. After performing those processes, the object light complex amplitude in-line hologram g is divided into a plurality of minute holograms $g_i$ in a division process (S33). Then, a synthetic minute hologram Σ is generated by piling up each minute hologram $g_i$ mutually (the values of the overlapping pixels are added) in a synthesis process (S34). In an expansion process (S35), the object light complex amplitude in-line hologram g of equation (9) mentioned above is replaced with the synthetic minute hologram Σ, and the transform function G etc. are calculated based on above-mentioned equations (10), (11), and (12). Once the transform function G(u, v) is obtained by the Fourier-transform, the light wave h(x, y) at an arbitrary distance z=$z_0$ can be obtained by equation (11). Moreover, the light intensity of the reconstructed light can be calculated using h(x, y) and from its squared absolute value $|h(x, y)|^2$.

According to such an image reconstruction method, a free focus image of a microscopic subject can be reconstructed at high speed, easily and accurately, by numerical computation using FFT. The width Δ of the minute hologram $g_i$ can be set according to the size of an image to be reconstructed regardless of the size (width D) or form (for example, circular, a rectangle, etc.) of the object light complex amplitude in-line hologram g(x, y). If the width Δ of division becomes smaller than the size of a reconstructed image, a reconstructed image will overlap. Therefore, for example, if the size of the microscopic subject 3 is 0.5 mm, width Δ will be made into a larger size than 0.5 mm.

(Further Another Method for Reconstructing an Image)

Figure 15:
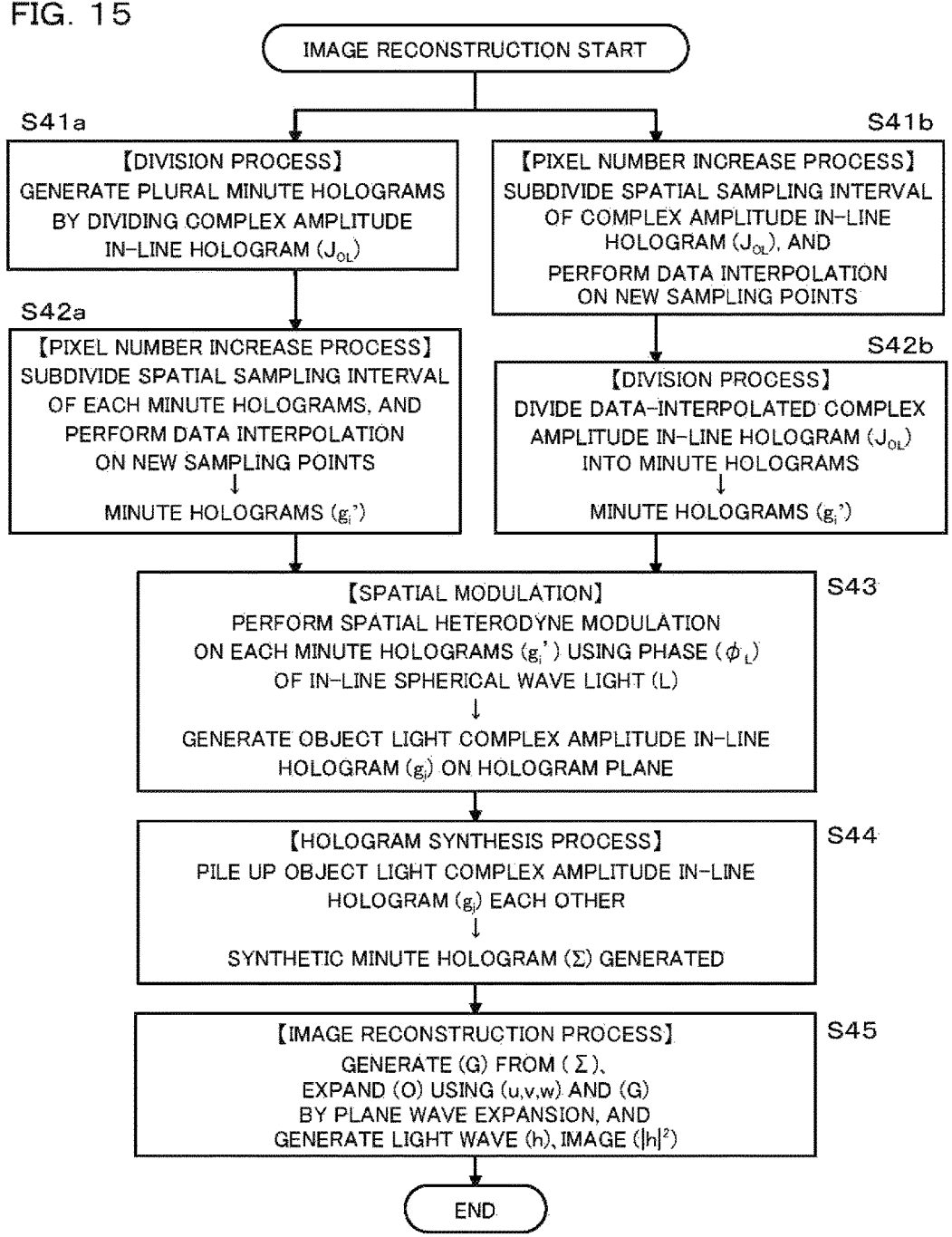
FIG. 15 is a flowchart showing further another method for reconstructing an image according to an embodiment of the present invention.

FIG. 15 shows further another image reconstruction method. This image reconstruction method is one that the pixel number increase process (S31), the spatial modulation process (S32), and the division process (S33) in FIG. 14 mentioned above are changed mutually by turns. That is, a division process (S41a) can be performed before a pixel number increase process (S42a), or a pixel number increase process (S41b) can be performed before a division process (S42b), and a spatial modulation process (S43) can be performed after those. In the spatial modulation process (S43), object light complex amplitude in-line holograms $g_j$ are generated by performing the spatial heterodyne modulation on the minute holograms $g_i'$ generated via the pixel number increase process (S42a) or the division process (S42b), using the same kind processing which drew the above-mentioned equation (9). This process for generating the minute holograms $g_i'$ can be expressed as a process for generating minute holograms $g_i'$ having substantially increased number of pixels from a complex amplitude in-line hologram $J_{OL}$ (this process is called division interpolation process) by applying following two processes in arbitrary order: a division process which generates a plurality of minute holograms by dividing a general hologram; and a pixel number increase process which subdivides the spatial sampling interval of a general hologram and performs a data interpolation on the new sampling point produced by subdivision.

After the spatial modulation process (S43), a hologram synthesis process (S44) follows. In the hologram synthesis process (S44), the synthetic minute hologram Σ is generated by piling up mutually the object light complex amplitude in-line holograms $g_j$. A subsequent image generation process (S45) is the same as the expansion process (S35) shown in above-mentioned FIG. 14, and generates the light wave h on a hologram plane or on an arbitrary position before and behind thereof by performing the plane wave expansion of the object light O using the transform function G.

(A Holographic Microscope)

Figure 16:
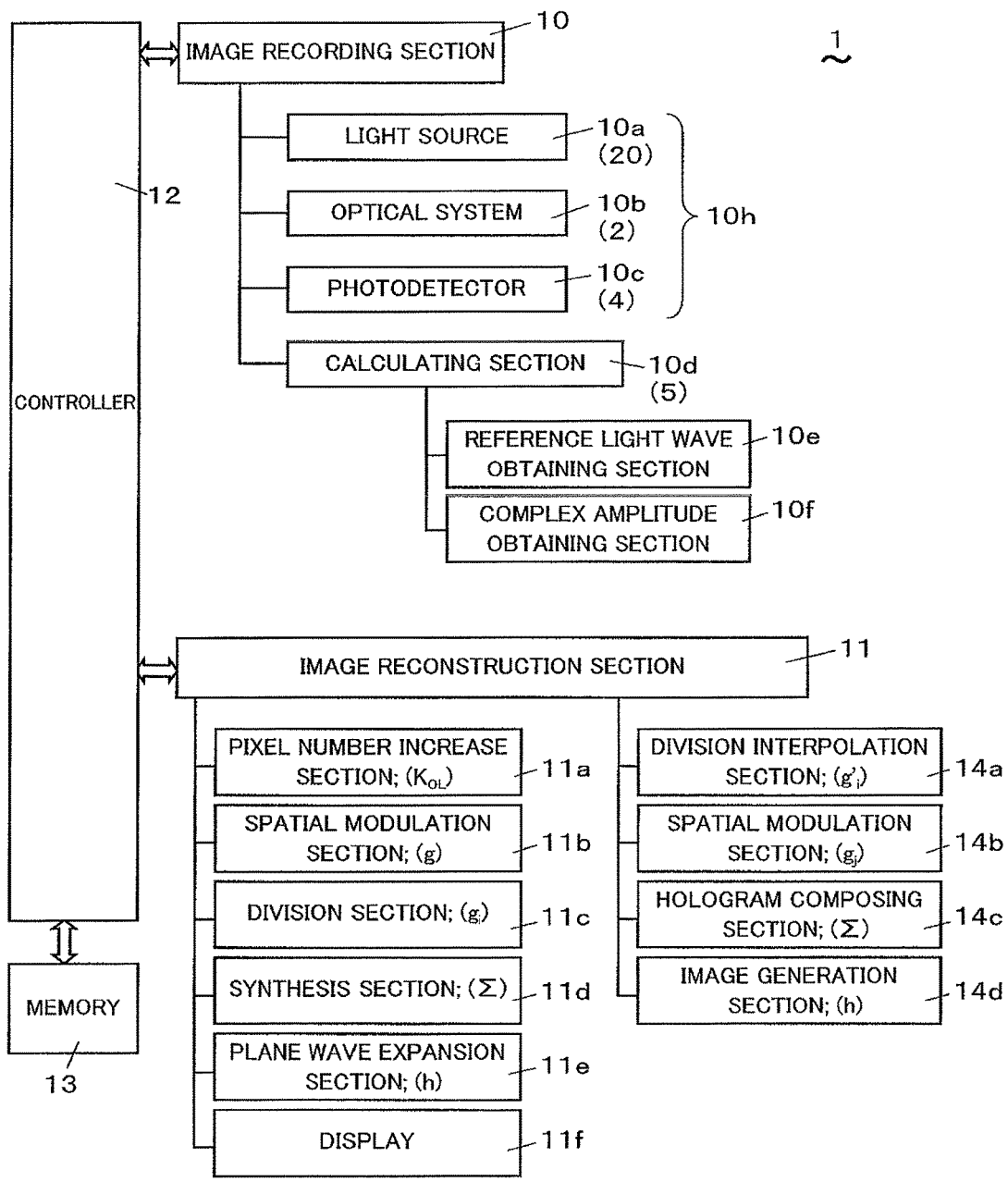
FIG. 16 is a block diagram of a holographic microscope according to an embodiment of the present invention.
Figure 17:
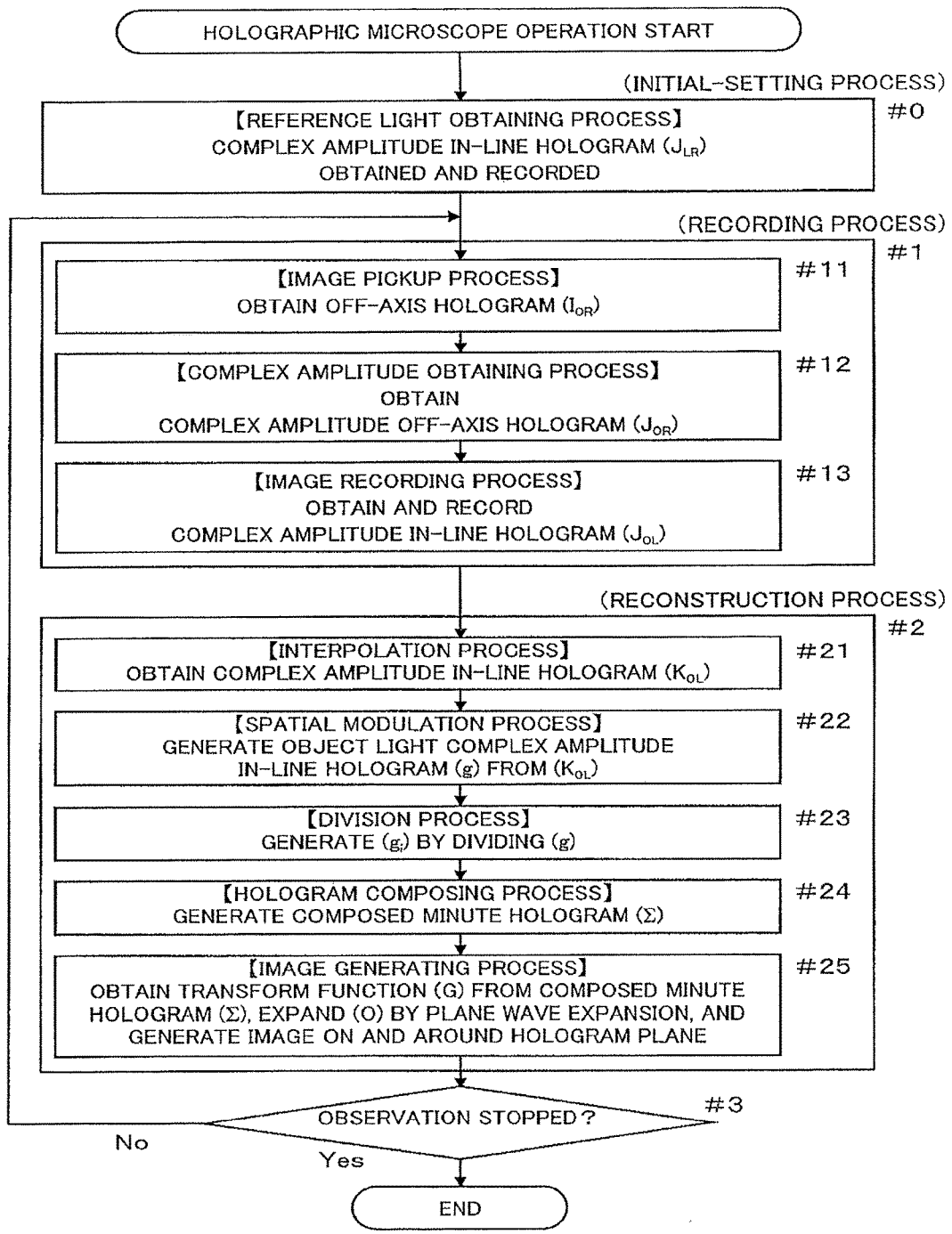
FIG. 17 is a flowchart showing operation of the microscope.

FIGS. 16 and 17 show a holographic microscope. As shown in FIG. 16, the holographic microscope 1 comprises an image recording section 10 which obtains and records hologram images of a microscopic subject, an image reconstruction section 11 which reconstructs the recorded image, a controller 12 which controls those sections, and a memory 13 which memorizes each data and a program. The image recording section 10 comprises a light source 10a, an optical system 10b, a photodetector 10c (these are named generically as an optical section 10h), and a calculating section 10d. Moreover, the calculating section 10d comprises a reference light wave obtaining section 10e which performs calculation at the time for obtaining a reference light wave, and a complex amplitude obtaining section 10f which performs calculation to obtain complex amplitudes, and those are constituted by software. The image recording section 10 is equivalent to the recording device 10 shown in above-mentioned FIGS. 2 and 6. Therefore, the light source 10a, the optical system 10b, the photodetector 10c, and the calculating section 10d are equivalent to the laser 20, the optical system 2, the photodetector 4, and the computer 5, respectively.

The image reconstruction section 11 comprises a pixel number increase section 11a, a spatial modulation section 11b, a division section 11c, a synthesis section 11d, a plane wave expansion section 11e, and a display 11f. The display 11f is a display which can display images, for example, a liquid crystal display for general purpose. Moreover, the image reconstruction section 11 comprises a division interpolation section 14a, a spatial modulation section 14b, a hologram composing section 14c, and an image generation section 14d. Each of the sections 11a to 11e, and 14a to 14d of the image reconstruction section 11 is constituted by software on a computer. The above-mentioned calculating section 10d, the image reconstruction section 11, the controller 12, and the memory 13 can be constituted with a computer as a device gathering up those and equipped with commonly used I/O units.

The image recording section 10 generates and records the complex amplitude in-line holograms $J_{OL}$ using the method for recording a hologram image of a microscopic subject explained based on above-mentioned FIGS. 1 to 7B. That is, the optical section 10h and the reference light wave obtaining section 10e in the image recording section 10 perform the reference light wave obtaining process (S1) in above-mentioned FIG. 1. Moreover, the optical section 10h and the complex amplitude obtaining section 10f in the image recording section 10 perform the image pick up process (S2) and the complex amplitude obtaining process (S3) in FIG. 1, and the calculating section 10d perform the image recording process (S4).

Moreover, the image reconstruction section 11 reconstructs an image using the method for reconstructing an image explained based on above-mentioned FIGS. 10, 14, and 15 from a complex amplitude in-line hologram $J_{OL}$ recorded by the image recording section 10. For example, each process in above-mentioned FIG. 14 is performed. Namely, the pixel number increase section 11a processes the pixel number increase process (S31), the spatial modulation section 11b processes the spatial modulation process (S32), the division section 11c processes the division process (S33), the synthesis section 11d processes the synthesis process (S34), and the plane wave expansion section 11e processes the expansion process (S35). Moreover, the plane wave expansion section 11e can also process the plane wave expansion process (S23) in above-mentioned FIG. 10.

Moreover, each of sections 14a to 14d of the image reconstruction section 11 performs each process in above-mentioned FIG. 15, for example. Namely, the division interpolation section 14a processes the division interpolation process using a division section and a pixel number increase section (both not shown) equipped for performing the division process (S41a or S42b) and the pixel number increase process (S42a or S41b), the spatial modulation section 14b processes the spatial modulation process (S43), the hologram composition section 14c processes the hologram synthesis process (S44), and the image generation section 14d processes the image generation process (S45).

The image recording section 10 may use a pulsed laser as the coherent light source 10a for hologram obtaining. Moreover, the image recording section 10 may generate and record a complex amplitude in-line hologram $J_{OL}$ in color by obtaining the off-axis hologram $I_{OR}$ using a plurality of lasers having mutually different zones of wavelength as the light source 10a. Moreover, the image reconstruction section 11 may reconstruct an image in color from a complex amplitude in-line hologram $J_{OL}$ in color. According to such a holographic microscope 1, a large numerical aperture hologram can be recorded by single shot, and reconstruction can be performed. The holographic microscope 1 can be a transmission type microscope or a reflection type microscope by the constitution shown in FIG. 2 or 6.

Operation of the holographic microscope 1 and the example of a method of use are described. The light source 10a is a pulsed oscillator for a laser beam, for example. The laser beam is branched by a beam splitter, and then each of them is changed into a spherical wave light from a parallel plane wave laser beam, and becomes an off-axis reference light R and a lighting light L or L2, respectively (refer to FIGS. 2 and 6). By illuminating a microscopic subject 3 placed in front of the photodetector 4 with the illumination light L or L2, an object light O containing three-dimensional image information is emitted from the microscopic subject 3. Note that as mentioned above, "microscopic" in the microscopic subject 3 should be recognized that it does not mean the subject itself is small but the object region for image recording is small. Moreover, the "microscopic" means small compared with the size of the photodetector 4.

Moreover, the object region for image recording is specified as a region irradiated with the illumination light by the in-line spherical wave light L or L2. These are related to the position of the focal point P and the spreading angle of the light condensed by the condenser lens in FIGS. 2, and 6, etc. The optical system 10b is set up so that the difference of the path lengths, from the light source 10a to the photodetector 10c, for the reference light and the object light is settled within the coherence length of the laser beam. The interference fringe pattern made by the reference light R and the object light O is recorded with the photodetector 10c as a large numerical aperture off-axis hologram $I_{OR}$. The recorded hologram data is sent to a computer (the controller 12) and numerically computed in the image reconstruction section 11, and a reconstructed image is displayed on a display (the display 11f).

The holographic microscope 1, as shown in FIG. 17, performs the reference light wave obtaining process once as an initial-setting process (#0), after that, repeats a recording process (#1) and a reconstruction process (#2) during the continuation of observation of the microscopic subject 3 by a user (No at #3), and stops these processes by end of the observation (Yes at #3). Note that the main player in each process in FIG. 17 is shown by quoting the note in each section in FIG. 16. In the initial-setting process (#0), preparations of the microscopic subject 3 by an observer etc. are performed and a reference light wave obtaining process for obtaining a complex amplitude hologram $J_{LR}$ is performed by the image recording section 10 in the situation that the microscopic subject 3 is removed. Moreover, in this initial-setting process (#0), various parameter input, for example, the distance ρ for setting up phase $\phi_L$, the size of the microscopic subject 3 for setting up the width Δ of division, etc. is performed. It is not necessary to perform this process repeatedly until the optical system 2 is changed, and the complex amplitude hologram $J_{LR}$ once obtained can be used repeatedly in the following processes.

In the recording process (#1), after the setting of the microscopic subject 3 by an observer, followings are performed by the image recording section 10: an image pickup process (#11) which obtains the off-axis hologram $I_{OR}$; a complex amplitude obtaining process (#12) which generates and obtains the complex amplitude off-axis hologram $J_{OR}$ from $I_{OR}$; and an image recording process (#13) which generates, obtains and records the complex amplitude in-line hologram $J_{OL}$ from $J_{OR}$. In the reconstructing process (#2), followings are performed by the image reconstruction section 11: an interpolation process (#21) which generates and obtains the complex amplitude in-line hologram $K_{OL}$ data-interpolated from $J_{OL}$; a spatial modulation process (#22) which generates the object light complex amplitude in-line hologram g from $K_{OL}$; a division process (#23) which generates the minute holograms $g_i$ by dividing g; a hologram composing process (#24) which generates the composed minute hologram Σ by composing each $g_i$ mutually; and an image generation process (#25) which obtains the transform function G from Σ, obtains the light wave h by performing the plane wave expansion of the object light O, and displays the image on the display using the squared absolute value $|h|^2$.

(First Working Example)

FIGS. 18A to 21 show the first working example. An image recording and an image reconstruction of the USAF test target were performed by the holographic microscope 1. A diode-pumped solid-state laser resulting in green light light was used as the laser 20 (the wave length of 532 nm, output of 50 mW). Moreover, a camera link CCD camera of monochrome was used as the photodetector 4 for hologram recording. An USAF test target was placed at the position about 5 cm ahead of the CCD camera as a photographic subject, and an interference fringe pattern made by an object light O and an off-axis reference light R (spherical wave light) was recorded Next, the USAF test target of a photographic subject was removed, and an interference fringe pattern made on CCD by an in-line spherical wave light L and an off-axis reference light R was recorded. A complex amplitude in-line hologram $J_{OL}$ was obtained from two recorded interference fringe patterns, and it was divided into 16×16, and 256 divided recording holograms were obtained. After performing the data interpolation and spatial heterodyne modulation to each divided recording hologram, the divided holograms (minute holograms $g_i$) were piled up and a minute hologram for image reconstruction (synthesis minute hologram Σ) was obtained. An image was reconstructed by applying FFT for numerical computation to the synthesis minute hologram Σ.

Figure 18A:
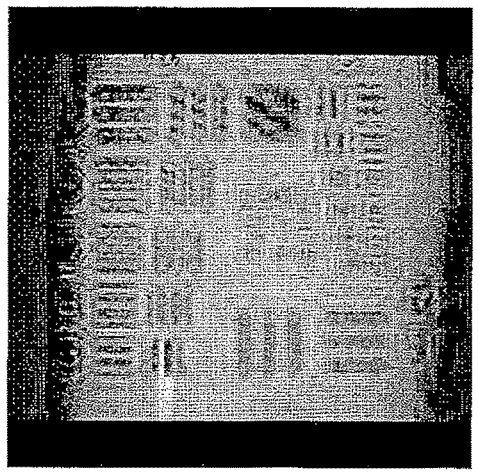
FIG. 18A is an image of an interference fringe pattern of a test target recorded using the microscope.
Figure 18B:
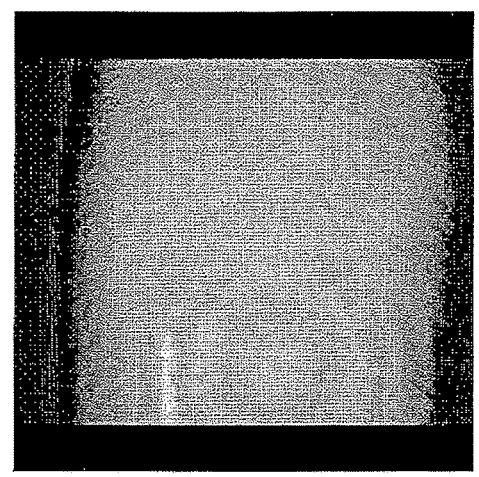
FIG. 18B is an image of an interference fringe pattern of a reference light recorded using the microscope.
Figure 19A:
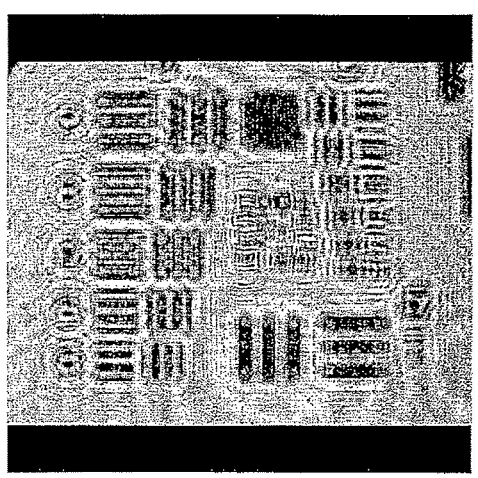
FIG. 19A is an image of an in-line hologram created from the interference fringe pattern shown in FIGS. 18A and 18B.
Figure 19B:
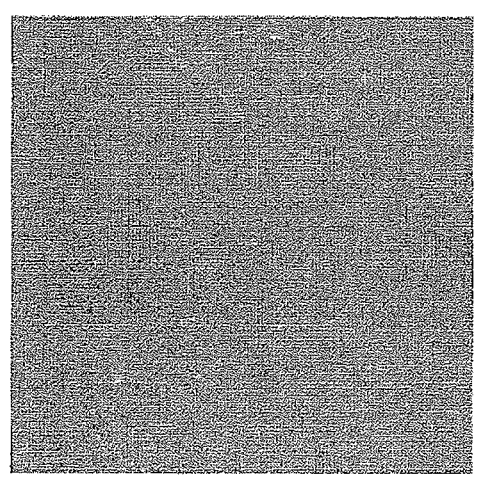
FIG. 19B is an image of a hologram for high-resolution image reconstruction created from the in-line hologram.

FIG. 18A shows the interference fringe pattern of the USAF test target recorded using the holographic microscope 1, and FIG. 18B shows the interference fringe pattern of the in-line spherical wave light L and the reference light R. A complex amplitude hologram was obtained by performing spatial frequency filtering to these two interference fringe patterns, respectively, and using those holograms, a complex amplitude in-line hologram $J_{OL}$ shown in FIG. 19A was obtained. This complex amplitude in-line hologram $J_{OL}$ was divided into 16×16, and a data interpolation, phase conversion, and a hologram superposition were performed to each minute division hologram, and a synthesis minute hologram Σ shown in FIG. 19B for image reconstruction was obtained.

Figure 20:
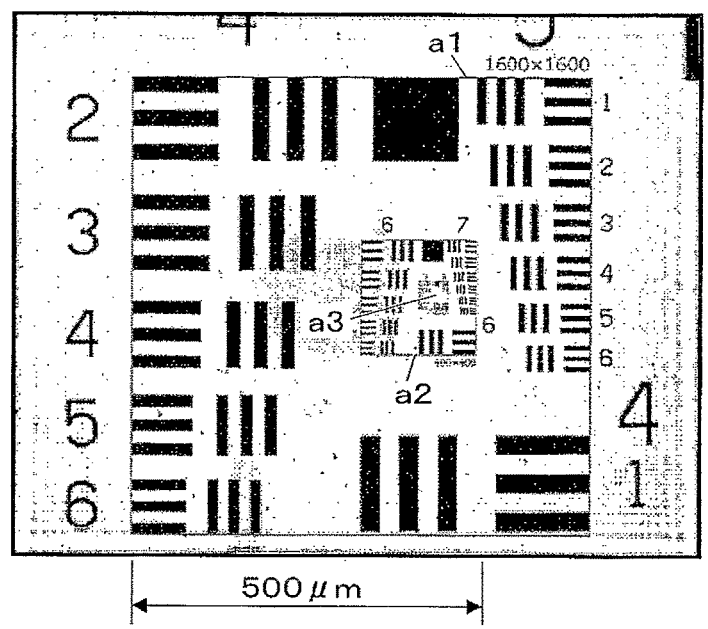
FIG. 20 is an image of a reconstructed image from the hologram shown in FIG. 19B.
Figure 21:
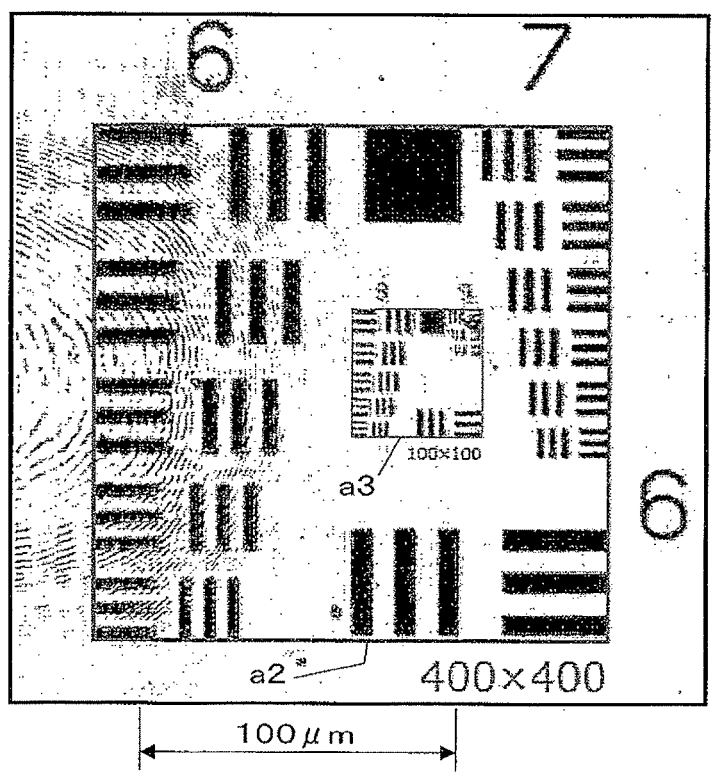
FIG. 21 is a magnified image of the reconstructed image shown in FIG. 20.

FIG. 20 shows a reproduced image of the USAF test target reconstructed from the synthetic minute hologram Σ, i.e., the complex amplitude in-line hologram $J_{OL}$. Moreover, FIG. 21 shows the magnified partial reconstructed image of the USAF test target. No distortion is found in the outer shapes of the big rectangular area al, the rectangular area a2 in the rectangular area a1, the rectangular area a3 in the rectangular area a2 in FIG. 20, and the rectangular areas a2 and a3 in FIG. 21. That is, the fact that the outer shape of each of the rectangular areas a1, a2, and a3 is constituted with straight lines is verified, and thus it is shown that no distortion arises at all in the reconstructed images. Moreover, since the line-and-space L/S=1.5 micrometer patterns in FIG. 21 are not deteriorated, the resolving power of the reconstructed image can be estimated at about 1 micrometer.

(Second Working Example)

Figure 22A:
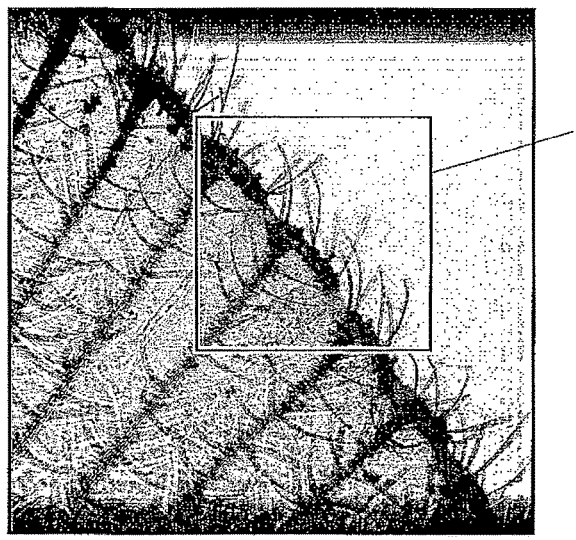
FIG. 22A is an image of a wing of a dragonfly recorded and reconstructed using the microscope.
Figure 22B:
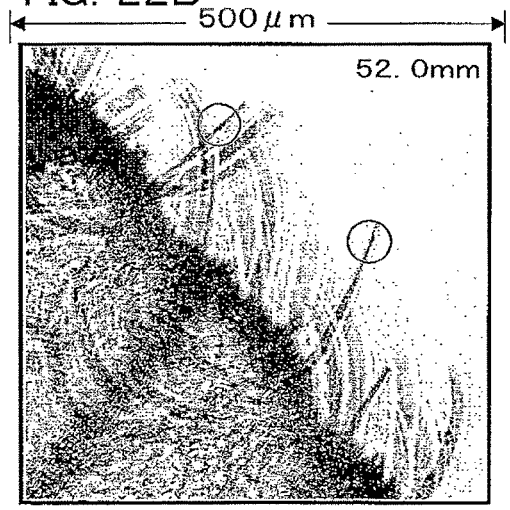
FIGS. 22B-22E are images of a part of the wing of the dragonfly reconstructed at each focal distance different every 0.1 mm.
Figure 22C:
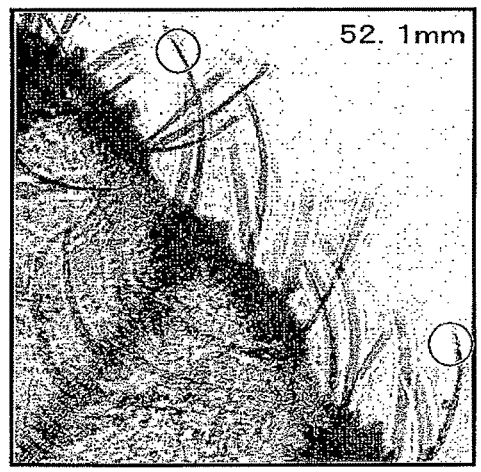
Figure 22D:
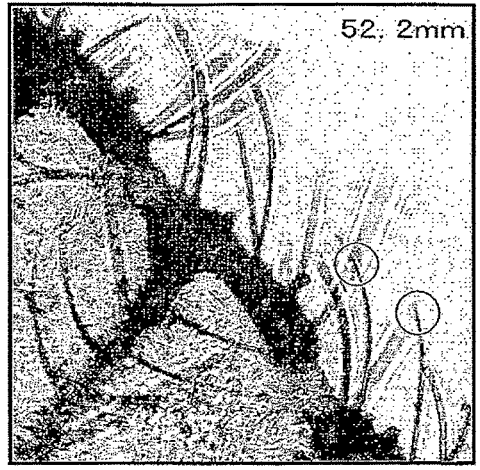
Figure 22E:
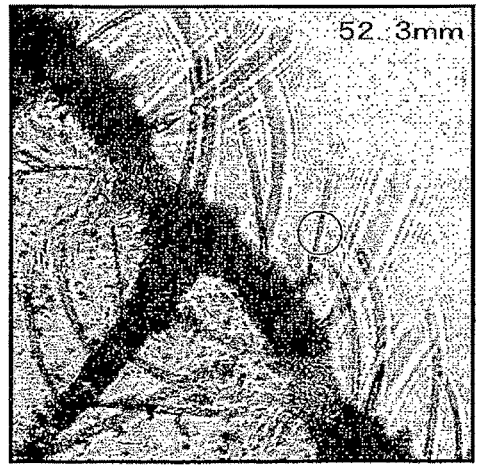

FIGS. 22A to 22E show the second working example. FIG. 22A shows an image of a minute section of a wing of a dragonfly recorded and reconstructed using the holographic microscope 1, and FIGS. 22B to 22E show further magnified cilia portion in the edge of the wing (domain A) in FIG. 22A. Moreover, FIGS. 22B to 22E show images reconstructed with changed focal distance, namely, $z_0$ in equation (11), which is made far every 0.1 mm sequentially from 52.0 mm. Thus, an aspect that the position of the cilia portion in focus (O mark portion in the figure) changes one by one can be observed with the changing focal distance. From the result of the images of FIGS. 22A to 22E, it was confirmed that the record and reconstruction of a three-dimensional image with large depth of focus are possible using the holographic microscope 1. Moreover, a value of about 1 micrometer as a resolving power was obtained from the images of the cilia portion in focus.

According to the holographic microscope 1 of the present invention, a transmission object light or a reflecting object light emitted from a photographic subject without using an image formation lens is recordable by single shot as a large numerical aperture complex amplitude in-line hologram. Therefore, a three-dimensional image of a microscopic subject moving in a space with depth can be recorded instantaneously. By using pulsed laser as the laser light source for record, it becomes possible to perform a high speed recording or a real time recording of a three-dimensional image, and not only a photographic subject in the air but also a photographic subject in a liquid like water, for example a microscopic moving object, can be recorded in real time. Moreover, since an object light is reconstructed using exact solutions of Helmholtz equation and a method of plane wave expansion, fast reconstruction of a distortionless free focus image can be carried out under a high resolution near a light wavelength. Furthermore, by using the technique of superposition of minute division holograms as a reconstruction method, the number of calculation points can be compressed and image reconstruction can be performed in higher speed and with higher resolution. It becomes possible to record and measure the microscopic subjects in the changes of the form, the changes of the position, and the vibration phenomena, etc. with high degree of accuracy using such reconstructed images. Furthermore, since a phase distribution of object light can be reconstructed, quantitative analyses of the composition etc. for a transparent substance become possible from the phase distribution of the object light (illumination light affected from the object) which transmitted a transparent photographic subject. Note that various modifications are possible for the present invention, without being restricted to the above-mentioned constitution. For example, constitution of each embodiment mentioned above can be combined mutually. Moreover, an ellipsoidal wave light can also be used as the spherical wave lights L, L2, and R.

(Object Light Propagation in a Medium and Image Reconstruction)

Next, the object light propagation in a medium other than a vacuum or air and image reconstruction are described. A uniform transparent medium like water or glass with a smooth flat surface is supposed, and the refractive index is denoted by n. Here, for example, a situation is assumed that a hologram image of the underwater microscopic subject 3 is recorded with a photodetector 4 placed in the air, and reconstructed. The medium surface (interface of air and water) is set as a x-y plane, and the spatial frequency of a plane wave propagating from air into water is expressed as (u, v, w) in air, and as (u', v', w') in water, respectively. Then, u=u' and v=v' are realized in the x-y plane. The z-direction spatial frequency w' in water can be obtained by the dispersion relation of the plane wave using following equation (13). The equation (13) is the above equation (12) in which λ is replaced with (λ/n). Moreover, the phases of the incident wave and the transmitted wave coincide at the interface.

$$w'(u,v)=\sqrt{(n/\lambda)^2-u^2-v^2} \quad (13)$$

Therefore, if the amplitude and the phase of an incident plane wave are known, the plane wave propagating in the medium can be obtained. Then, in order to reconstruct an object light h'(x, y) on an image reconstruction plane at an arbitrary position z=z0 in a medium by the calculation from a complex amplitude hologram g(x, y) in which an object light at z=0 is recorded, for a start, an object light h is obtained on the medium surface of position z=zB (x, y) using equations (10), (11), and (12). Position z=zB can be obtained from a focusing position, for example, by arranging beforehand a photographic subject which serves as a mark showing the medium surface, recording an image so that the mark may be included, and reconstructing the image focusing on the mark. Note that as for the accuracy of the medium surface position z=zB, a high degree of accuracy like a light wavelength grade is not required, but the influence of bad accuracy will appear as a displacement of a focusing position. Next, h'(x, y) is obtained from h(x, y) by performing optical propagation calculation in the medium using equation (13). The reconstructed image at z=z0 can be calculated by square of optical amplitude |h'(x, y)|². When a plurality of media and interfaces exist, in the case of an object in the liquid held between two glass plates, for example, an objective image can be reconstructed by calculating propagation of the object light in air, glass, and liquid one by one. This method can be extended and applied easily also to the general interface of arbitrary known arrangement and form to the photodetector 4.

(Optical System of a Transmission Type Microscope Using a Half Mirror)

Figure 23:
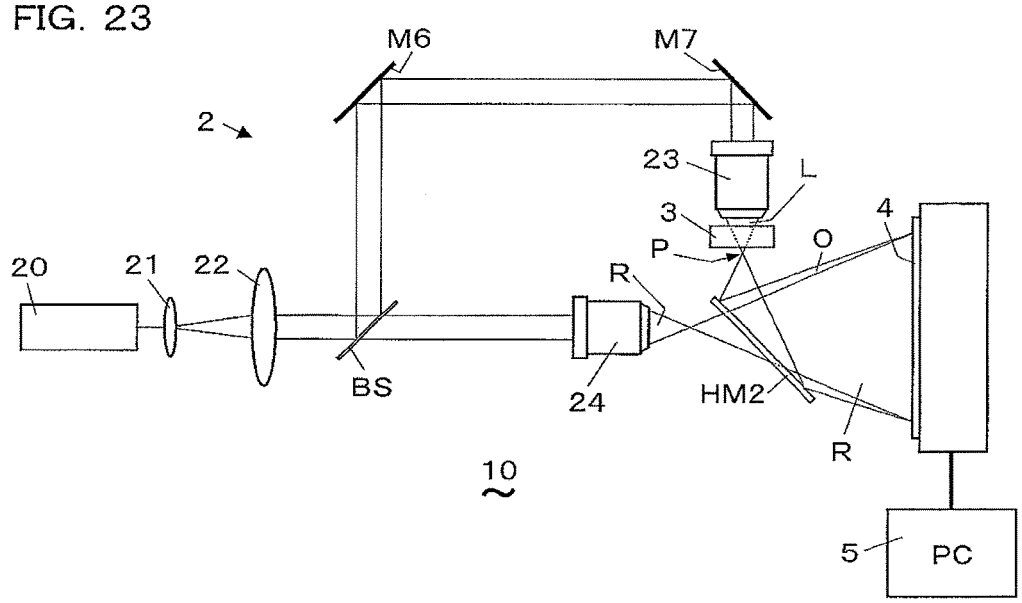
FIG. 23 is a schematic block diagram showing another example of a hologram image recording device for applying the recording method to a transparent microscopic subject.

Next, with FIG. 23, another example of the optical system 2 of a transmission type microscope is described. The optical system 2 of this recording device 10 is the one which uses half mirror HM2 instead of the small mirror M3 in the optical system 2 of the recording device 10 shown in above-mentioned FIG. 2. The optical system 2 is equipped with lenses 21 and 22 which enlarge the diameter of the light from the laser 20, a beam splitter BS which branches the enlarged light, and condenser lenses 23 and 24 which condense each light. Two mirrors M6 and M7 are equipped between beam splitter BS and the condenser lens 23, and the light branched with the beam splitter BS is deflected 180 degrees by the mirrors M6 and M7, and enters into the condenser lens 23. Ahead of the condenser lens 24, there exists a photodetector 4 beyond the half mirror HM2 inclined 45 degrees for example, and the condenser lens 24 rightly faces the light receiving surface of the photodetector 4. The photodetector 4 is CCD, for example. In this arrangement, each optical axis of the laser 20, the condenser lens 24, and the photodetector 4 coincide, and the optical axis of the condenser lens 23 lies at right angles to those optical axes. The light which passed the condenser lens 23 is changed into a spherical wave by the condenser lens 23, reflected by half mirror HM2, and floods the photodetector 4 as an in-line spherical wave light L. The microscopic subject 3 is placed between the condenser lens 23 and the half mirror HM2, and is illuminated from behind. The focal point P (central point of a spherical wave) of the in-line spherical wave light L exists between the condenser lens 23 and the half mirror HM2. The light which passed the condenser lens 24 is changed into a spherical wave which has a focus near the mirror point of the above-mentioned focal point P by the condenser lens 24, penetrates the half mirror HM2, and floods the photodetector 4 as an off-axis reference light R.

Since two objective lenses (the condenser lenses 23 and 24) can be set up for vertical mutually by using half mirror HM2, the numerical aperture of the two reference lights R and L in this optical system 2 can be made large compared with the optical system 2 in the case of using the mirror M3 as shown in above-mentioned FIG. 2. Moreover, since half mirror HM2 can be arranged nearer the photodetector 4 rather than the focusing position of each objective lens, a design and regulation of the optical system 2 become easy, and a space for arranging the microscopic subject 3 can also be made large. By the way, when using the half mirror HM2, the off-axis reference light R penetrating the half mirror will be distorted from a spherical wave under the influence of the glass plate which constitutes the half mirror HM2. However, since the complex amplitude in-line hologram obtained eventually is not dependent on the reference light R as known by above equation (8), the influence of the glass plate does not appear in the in-line hologram. From those points, the optical system 2 of FIG. 23 using the half mirror HM2 is more advantageous to the transmission type microscope rather than the optical system 2 of FIG. 2 using the mirror M3.

(Result of the Record and Reconstruction of the Three-Dimensional Image in a Medium)

Figure 24A:
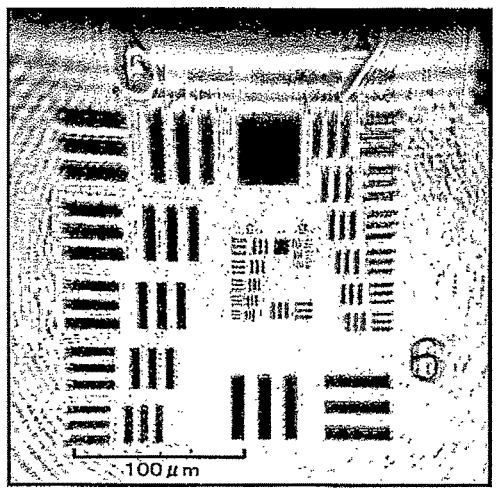
FIG. 24A is an image of a test target covered by a glass plate reconstructed from a hologram recorded using the microscope without taking into account the existence of the glass plate.
Figure 24B:
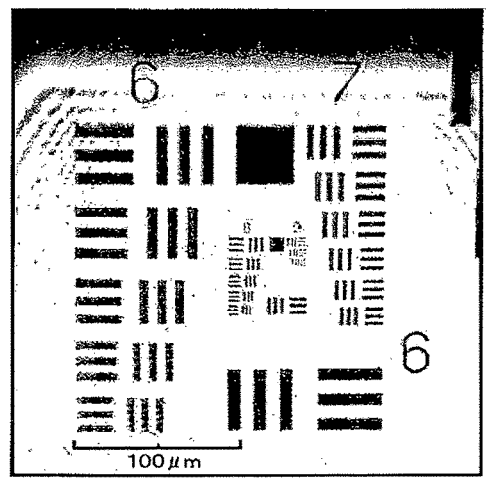
FIG. 24B is an image reconstructed from the hologram with taking into account the existence of the glass plate.

FIGS. 24A and 24B show images of an USAF test target covered with a glass plate (the refractive index 1.523 and 1.5 mm in thickness) recorded and reconstructed with the optical system of the transmission type constitution shown in above-mentioned FIG. 23. FIG. 24A shows the image reconstructed as an object in the air by disregarding the existence of the glass plate, and FIG. 24B shows the image reconstructed in consideration of the existence of the glass plate by calculating the optical propagation in the glass. As shown in FIG. 24A, in the reconstructed image without consideration of the optical propagation in glass, distortion and out-of-focus occur because of the existence of the glass plate, and the distortion and out-of-focus become larger as departing from the center of the reconstructed image and as approaching to the peripheries. It can be seen that the resolving power is falling because of the glass plate even in the central part where the distortion and out-of-focus are small. As shown in FIG. 24B, it is possible to eliminate the influence of the existence of the glass plate in the image which is reconstructed by calculating the optical propagation considering the existence of the glass plate, and it becomes possible to reconstruct a high-resolution image without distortion.

FIGS. 25A and 25B show images of underwater paramecia reconstructed from one hologram. A gap of 2 mm made by upper and lower two glass plates of 0.015 mm thick was fulfilled with water, and the paramecia moving in the water was illuminated with CW laser light, and instantaneous record was carried out by an exposure time of 0.7 msec. The optical system is the transmission type constitution shown in FIG. 23, and the microscopic subject 3 is the paramecia in the water between two glass plates. A complex amplitude in-line hologram was obtained from a recorded large numerical aperture off-axis hologram, and the reconstructed images were obtained by numerically calculating the object light propagating in air, glass, and water using the complex amplitude in-line hologram. FIG. 25A shows the reconstructed image focused on the position with a depth of 0.69 mm from the glass surface, and FIG. 25B shows the reconstructed image focused on the position with a depth of 1.49 mm from the glass surface. By carrying out numerical computation in consideration of the propagation of the object light in a medium, the aberration by media, such as the glass container and water, can be eliminated, and as shown in those figures, high-resolution images without distortion and out-of-focus can be obtained. Therefore, it becomes possible, for example, to carry out three-dimensional recording and observation of a motion of a microbe in culture solution or particulates in a fluid medium in real time by performing the continuous recording and high-speed image reconstruction of a time series holograms using the lensless microscope of the present invention.

(Speeding-Up of Image Reconstruction)

Figure 26:
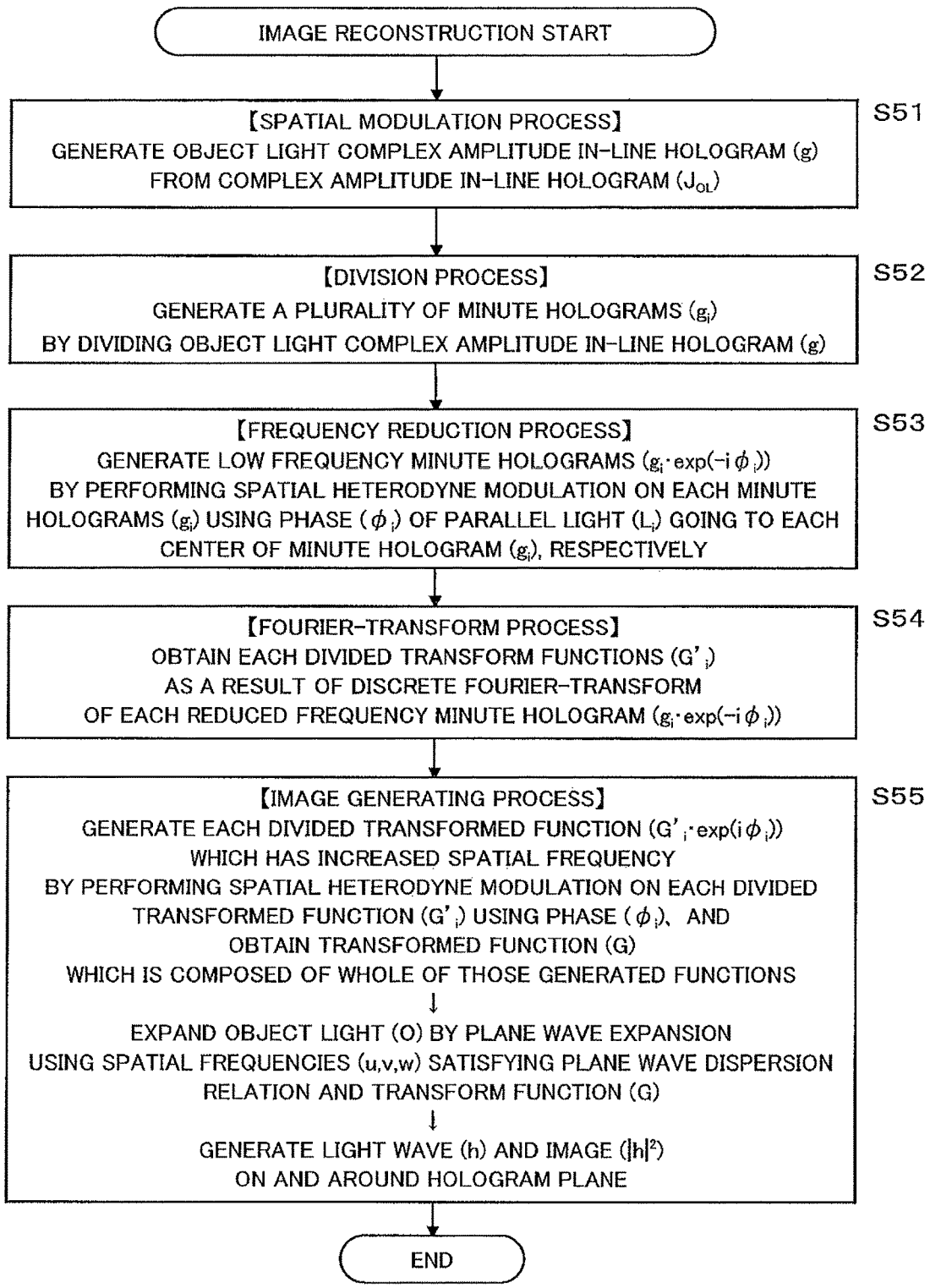
FIG. 26 is a flowchart showing an accelerated method for reconstructing an image according to an embodiment of the present invention.

Next, with reference to FIGS. 26 and 27, another method for speeding-up of the image reconstruction is described. For the first step, the high-resolution image reconstruction method by the plane wave expansion mentioned above is reviewed. In the above-mentioned reconstruction method, the transform function G of equation (10) is obtained by performing: the subdividing of the spatial sampling interval and the data interpolation on the in-line hologram; the division of the hologram and superposition to generate the synthetic minute hologram $\Sigma$ for reconstruction; and the Fourier-transform of the synthetic minute hologram $\Sigma$. That is, the above-mentioned reconstruction method increases the spatial sampling points in order to reconstruct a high-resolution image, and performs the division and the superposition of the hologram in order to cancel the increase of the calculation load due to increasing the spatial sampling points. However, the calculation of the subdivision of the sampling interval, the data interpolation, and the superposition of the holograms requires time after all. Then, if a transform function corresponding to the transform function G of the above-mentioned synthetic minute hologram $\Sigma$ can be obtained without subdividing the sampling interval, speeding-up of image reconstruction will be possible by that. Such an image reconstruction method becomes the one, as shown in FIG. 26, comprising a spatial modulation process (S51), a division process (S52), a frequency reduction process (S53), a Fourier-transform process (S54), and an image generation process (S55). Hereafter, each process is described in order.

(The Spatial Modulation Process S51, and the Division Process S52)

The object light complex amplitude hologram g(x, y) denoted by above equation (9) can be considered as a hologram directly obtained from $J_{OL}$(x, y) of equation (8) without performing the pixel number increase process (S11) in FIG. 8. That is, g of equation (9) is obtained by multiplying $J_{OL}$ of equation (8) by $\exp(i\phi_L(x, y))$. Then, it is assumed hereinafter that a hologram g and a minute hologram $g_i$ made by dividing g (these are also called as function g and $g_i$) described below are not of increased pixel number. The spatial frequency of the hologram g becomes higher in monotone-increase from a center section to edges like Newton rings, for example, because it have been obtained using a spherical wave light. Here, a plurality of minute holograms $g_i$ are considered which are made by dividing the hologram g into pixel number N×N of parts.

(Frequency Reduction Process S53)

Considering a parallel light $L_i$ (plane wave) going towards the center of each division hologram $g_i$ from the focal point P (or P0) of the spherical wave light L, the angle between the object light O in each division minute hologram $g_i$ and the parallel beam $L_i$ becomes small. Then, if each minute hologram $g_i$ is multiplied by $\exp(-i\phi_i)$, where $\phi_i(x, y)$ denotes the phase of the parallel beam $L_i$, a low frequency minute hologram $g_i \cdot \exp(-i\phi_i)$ of reduced spatial frequency will be generated. Generally, for variables $\alpha$ and $\beta$, $\exp(i\alpha) \cdot \exp(i\beta)$ means addition between variables, and $\exp(i\alpha)/\exp(i\beta)$ means subtraction between variables. Here, the center coordinates (x, y) of a picture element (k, l) in the minute hologram $g_i$ of pixel number N×N are expressed by using the interval d of the pixels as x=kd and y=ld, and the incident angle made by the normal of the minute hologram $g_i$ and the parallel light $L_i$ is expressed as $\theta_{ix}$ and $\theta_{iy}$ in the x direction and y direction, respectively. Then, the phase $\phi_i(k, l)$ of the parallel beam $L_i$ in a general pixel (k, l) based on a pixel (k, l)=(0, 0) can be expressed by following equations (14), (15), and (16).

$$\phi_i(k, l) = 2\pi\left(\frac{m_i k + n_i l}{N}\right) \tag{14}$$

$$m_i = INT(Nd \sin \theta_{ix}/\lambda) \tag{15}$$

$$n_i = INT(Nd \sin \theta_{iy}/\lambda) \tag{16}$$

Function INT (*) in above equation (15) and (16) is a function which returns the integer portion of the number *. Moreover, Nd is a size of the minute hologram $g_i$. Furthermore, $m_i$ and $n_i$ show the number of the waves of parallel light $L_i$ contained in the size, and $2\pi m_i/N$ and $2\pi n_i/N$ are units of the discrete phase change in a x direction and a y direction, respectively. The remoter the minute hologram $g_i$ is located from the center, the larger those $m_i$ and $n_i$ are. Moreover, $m_i$ and $n_i$ are integers by integerization of equations (15) and (16), and $m_ik+n_il$ is also an integer. Therefore, as shown in equation (14), the phase $\phi_i(k, l)$ in each pixel on each division minute hologram $g_i$ is a discrete value of the integral multiple of $2\pi/N$ by using m, and n, of equations (15) and (16).

(Fourier-Transform Process S54)

Not only a divided transform function G'$_i$(m, n) which is a result of a discrete Fourier-transforming of the low frequency minute hologram $g_i \cdot \exp(-i\phi_i)$ but also $g_i(k, l) \cdot \exp(-i\phi_i(k, l))$ which is a result of an inverse transform of it, in a discrete sampling point (k, l), k=0, 1, . . . , N−1, l=0, 1, . . . , N−1, are denoted by following equations (17) and (18), respectively.

$$G'_i(m, n) = \tag{17}$$

$$\sum_{k=0}^{N-1} \sum_{l=0}^{N-1} \left\{ g_i(k, l) \exp\left[-i2\pi\left(\frac{m_ik + n_il}{N}\right)\right] \right\} \exp\left[-i2\pi\left(\frac{mk+nl}{N}\right)\right]$$

$$g_i(k, l) \exp\left[-i2\pi\left(\frac{m_ik + n_il}{N}\right)\right] = \tag{18}$$

$$\frac{1}{N^2} \sum_{m=0}^{N-1} \sum_{n=0}^{N-1} G'_i(m, n) \exp\left[i2\pi\left(\frac{mk+nl}{N}\right)\right]$$

G'$_i$(m, n) of above equation (17) is a periodic function of the period N on m and n. For example, even if m is replaced with m+N, the value of the equation does not change. This means that equation G'$_i$(m+N, n)=G'$_i$(m, n) holds. Similarly, the function $g_i(k, l)$ is also a periodic function of the period N on k and l. The maximum spatial frequency F of the function $g_i \cdot \exp(-i\phi_i)$, which has low spatial frequency, satisfies an inequality F<1/(2d). Therefore, the periodic function $g_i \cdot \exp(-i\phi_i)$ can be expressed exactly, based on the sampling theorem, using the divided transform function G'$_i$(m, n) of variables of integers m and n which satisfy −N/2<m<N/2 and −N/2<n<N/2 (the equations, each term of which is divided by d, express spatial frequency zones). That is, the divided transform function G'$_i$(m, n) is obtained as a discrete Fourier-transform of the periodic function $g_i \cdot \exp(-i\phi_i)$. Moreover, an expansion formula of the high spatial frequency function $g_i(k, l)$ is obtained by multiplying the both sides of equation (18) by $\exp(i2\pi(m_ik+n_il)/N)$ to eliminate the exp term from the left hand side. In this case, the function $g_i$ can be expressed exactly using the divided transform function G'$_i$(m−m$_i$, n−n$_i$) of variables of integers m and n which satisfy −N/2+m$_i$<m<N/2+m$_i$ and −N/2+n$_i$<n<N/2+n$_i$ (the equations, each term of which is divided by d, express spatial frequency zones). That is, the divided transform function G'$_i$(m−m$_i$, n−n$_i$) is obtained as a discrete Fourier-transform of the function $g_i$. This divided transform function G'$_i$(m−m$_i$, n−n$_i$) is the one whose spatial frequency is increased by multiplying the divided transform function G'$_i$(m, n) by $\exp(i\phi_i)$, and performing spatial heterodyne modulation. That is, G'$_i$(m−m$_i$, n−n$_i$)=G'$_i$(m, n)exp(i2π(m$_i$k+n$_i$l)/N), and the function G'$_i$(m, n) is shifted in a frequency space by parameters m$_i$ and n$_i$ denoting the wave numbers.

(Image Generation Process S55)

The divided transform function G'$_i$(m−m$_i$, n−n$_i$) of each minute hologram $g_i$ calculated above is shifted by parameters m$_i$ and n$_i$ in the frequency space, and does not overlap mutually. This fact, namely, no overlapping mutually, is important. That is, a transform function G is obtained as a whole of the plurality of divided transform functions G'$_1$ (m−m$_i$, n−n$_i$), in other words, as a result of composing operation of a zone continuation or a stretch-and-extension in the frequency space. This transform function G will occupy the wide range of frequency space. This means that a light wave in real space can be reconstructed with high-resolution using the transform function G in the frequency space. That is, a transform function G for high-resolution image reconstruction which is equivalent to the transform function G of equation (10) obtained by Fourier-transforming of the synthetic minute hologram Σ can be obtained by composing each G'$_i$(m−m$_i$, n−n$_i$) distributed over a large frequency band. Using such a transform function G, an image can be reconstructed by obtaining the light wave h(x, y) with equation (11), like above-mentioned.

As shown in FIG. 27, according to the method of the image reconstruction described here, since it is not necessary to perform the subdivision and the data interpolation of the sampling interval, the transform function G can be calculated at high speed, and fast reconstruction of an image becomes possible. That is, a transform function corresponding to the transform function G of the synthetic minute hologram Σ can be obtained by this method without doing the calculation for the pixel number increase by the subdividing of a sampling interval and the superposition. Note that if parameter m$_i$ and n$_i$ are not the integral multiples of N, overlaps between zones or gaps will occur in the transform function G which is the result of the zone continuation. Moreover, the hologram g can also be divided into pixel number N×M (N≠M) of parts instead of dividing into pixel number N×N of parts. In this case, each function has a different period N, M about x, y direction, respectively. What is necessary is just to make the size of the minute hologram $g_i$ larger than the size of the object to see, as explained in relation to FIGS. 11A to 14. The whole calculation speed does not so much changed even if the number of divisions of the hologram g (number of the minute holograms $g_i$) are increased, (from the characteristics of FFT, the more the number of partitions is, the quicker it becomes). Moreover, since resolving power is determined by the size of the hologram g essentially, it is not dependent on the number of divisions.

(Another Speeding-Up of the Image Reconstruction)

Figure 28:
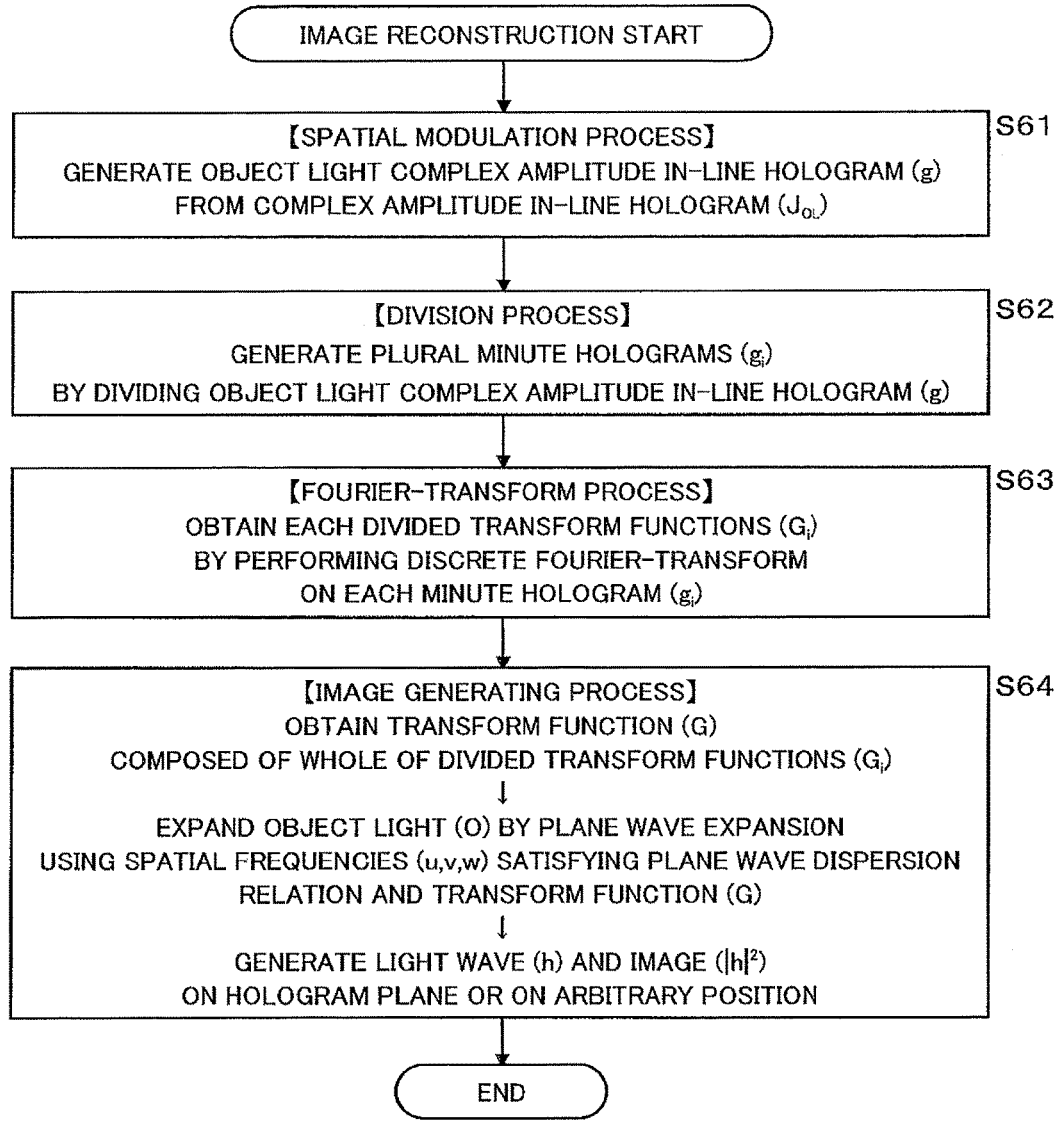
FIG. 28 is a flowchart showing another accelerated method for reconstructing an image according to an embodiment of the present invention.
Figure 29:
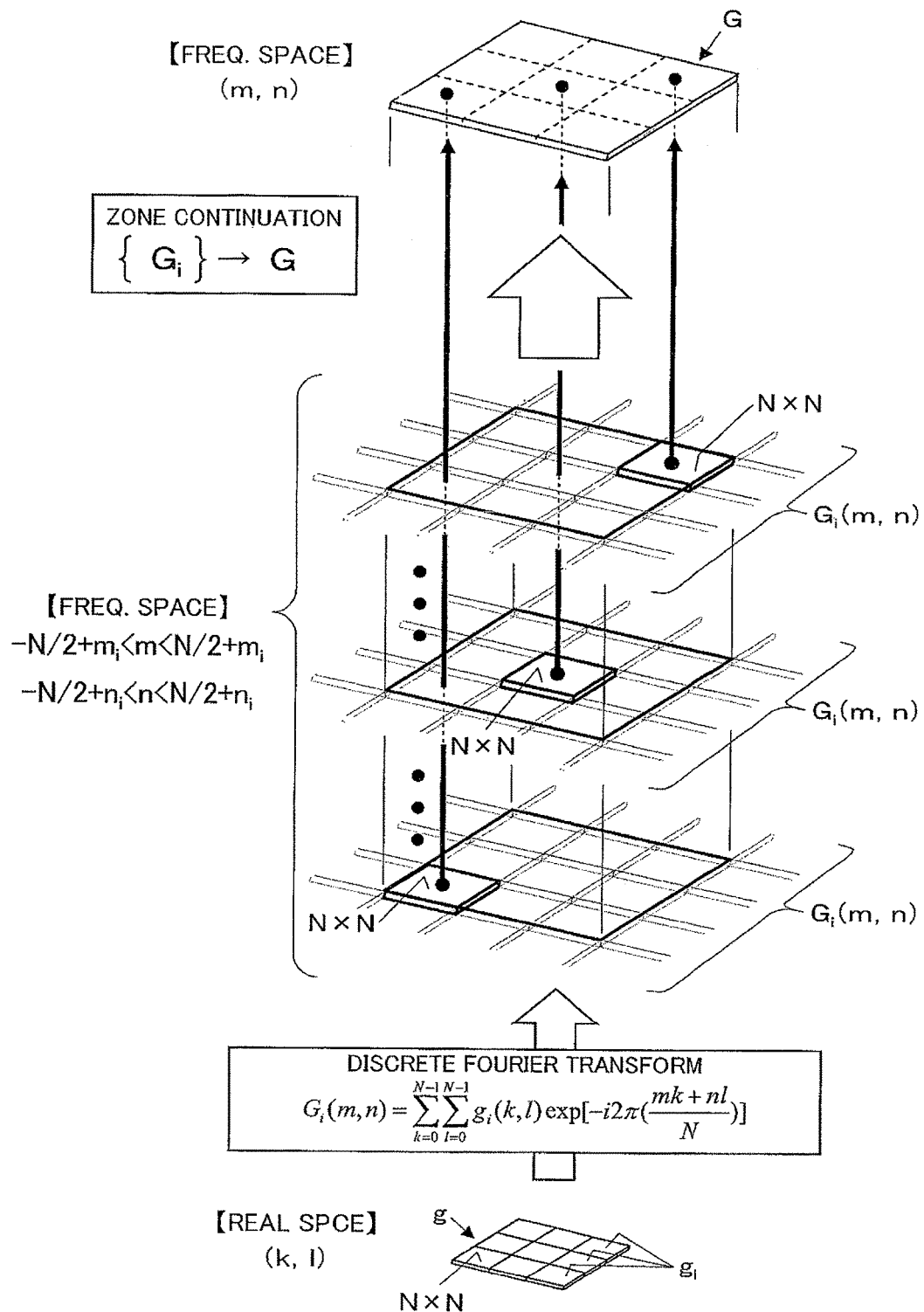
FIG. 29 is a conceptual explanatory diagram showing the method for reconstructing an image.

Next, further another method for speeding-up of the image reconstruction are described. This image reconstruction method is, as shown in FIGS. 28 and 29, differs from the method in above-mentioned FIG. 26 in that it does not have a frequency reduction process (S53), and others are the same as that of the above-mentioned speeding-up method. In the above-mentioned method, the high frequency function $g_i$ was changed into the low frequency function $g_i \cdot \exp(-i\phi_i)$ in order to satisfy the inequality F<1/(2d) when calculating the divided transform function G'$_i$(m, n). Here, a divided transform function G$_i$(m, n), given by following equation (19), is considered, which is a discrete Fourier-transform to the sampling value $g_i(k, l)$ of function $g_i$.

$$G_i(m, n) = \sum_{k=0}^{N-1} \sum_{l=0}^{N-1} g_i(k, l) \exp\left[-i2\pi\left(\frac{mk+nl}{N}\right)\right] \quad (19)$$

The function $g_i$ is a high frequency function, and its maximum spatial frequency F does not necessarily fill inequality $F<1/(2d)$. Therefore, the function $g_i$ cannot necessarily be exactly expressed using the divided transform function $G_i(m, n)$ in the ranges $N/2<m<N/2$ and $-N/2<n<N/2$. However, $G_i(m, n)$ is a periodic function of period N on m and n, as shown in equation (19). Moreover, equation $G_i(m, n)=G'_i(m-m_i, n-n_i)$ is obtained using a equations (17) and (19). Therefore, it is possible to express exactly the high frequency function $g_i$ with $G'_i(m-m_i, n-n_i)$ in the ranges $-N/2+m_i<m<N/2+m_i$ and $-N/2+n_i<n<N/2+n_i$, i.e., $G_i(m, n)$. Namely, even if in the case where the maximum spatial frequency F does not fill inequality $F<1/(2d)$, a frequency component $G_i(m, n)$ of the function $g_i$ in $-N/2+m_i<m<N/2+m_i$ and $-N/2+n_i<n<N/2+n_i$ can be directly obtained using the periodicity of $G_i(m, n)$ and equation (19). Moreover, a transform function G for high-resolution image reconstruction being equivalent to the transform function G of equation (10) which is obtained by Fourier-transforming the synthetic minute hologram Σ can be obtained by composing each $G_i(m, n)$, like above-mentioned. Using such a transform function G, an image can be reconstructed by obtaining the light wave $h(x, y)$. Equation (19) is still easier as compared with equation (17), and calculation can be accelerated more by using equation (19).

(Another Example of a Holographic Microscope)

Figure 30:
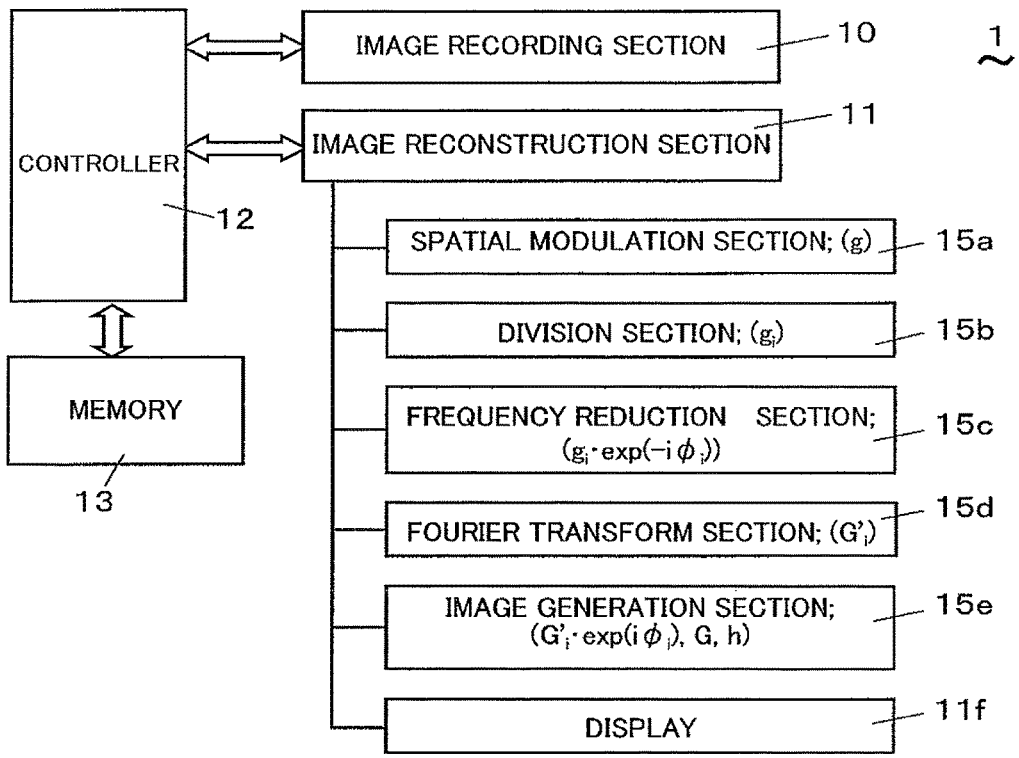
FIG. 30 is a block diagram showing another example of a holographic microscope according to an embodiment of the present invention.

FIG. 30 shows another example of a holographic microscope. This holographic microscope 1 is different from the holographic microscope 1 shown in FIG. 16 in the constitution of the image reconstruction section 11, and the others of this holographic microscope 1 are the same as those of the holographic microscope 1 shown in FIG. 16. Explanation is omitted about the constitution of the image recording section 10. The image reconstruction section 11 is equipped with a spatial modulation section 15a, a division section 15b, a frequency reduction section 15c, a Fourier-transform section 15d, an image generation section 15e, and a display 11f. The display 11f is the same as the one mentioned above. This image reconstruction section 11 reconstructs an image using the image reconstruction method explained based on above-mentioned FIGS. 26 and 27 from a complex amplitude in-line hologram $J_{OL}$ recorded by the image recording section 10. Namely, the spatial modulation section 15a processes the spatial modulation process (S51), the division section 15b processes the division process (S52), the frequency reduction section 15c processes the frequency reduction process (S53), the Fourier-transform section 15d processes the Fourier-transform process (S54), and the image generation section 15e processes the image generation process (S55).

(Further Another Example of a Holographic Microscope)

Figure 31:
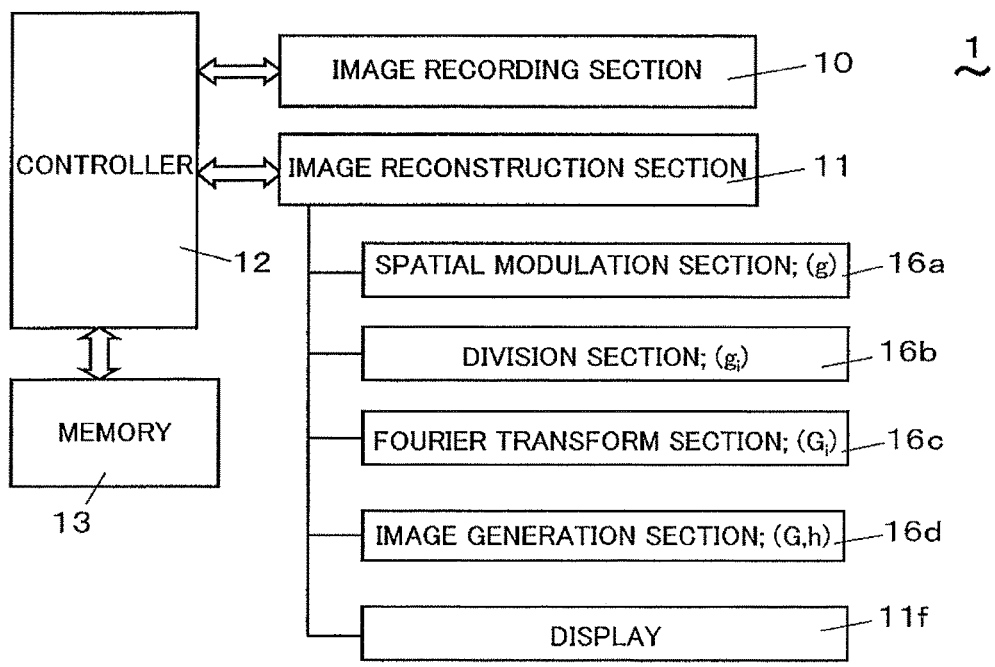
FIG. 31 is a block diagram showing further another example of a holographic microscope according to an embodiment of the present invention.

FIG. 31 shows further another example of a holographic microscope. This holographic microscope 1 is different from the holographic microscope 1 shown in FIG. 16 in the constitution of the image reconstruction section 11, and the others of this holographic microscope 1 are the same as those of the holographic microscope 1 shown in FIG. 16. Explanation is omitted about the constitution of the image recording section 10. The image reconstruction section 11 is equipped with a spatial modulation section 16a, a division section 16b, a Fourier-transform section 16c, an image generation section 16d, and a display 11f. The display 11f is the same as the one mentioned above. This image reconstruction section 11 reconstructs an image from a hologram using the image reconstruction method explained based on above-mentioned FIGS. 28 and 29. That is, the spatial modulation section 16a processes the spatial modulation process (S61), the division section 16b processes the division process (S62), the Fourier-transform section 16c processes the Fourier-transform process (S63), and the image generation section 16d processes the image generation process (S64). This microscopes 1 differs in that it does not have the frequency reduction section 15c in the microscope 1 shown in above-mentioned FIG. 30.

INDUSTRIAL APPLICABILITY

The method for recording a hologram image of a microscopic subject, the method for generating a hologram for high-resolution image reconstruction, the method for reconstructing an image, and the holographic microscope (three-dimensional microscope) based on an off-axis holography using a spherical wave light as an illuminating light according to the present invention have many advantages: single shot recording of a distortionless object light wave front without using an image formation lens; high speed recording or real time recording using a pulsed laser; recording of a transmission object light or a reflecting object light; reconstruction of a distortionless free focus image using exact solution; high-speed image reconstruction using FFT; and quantitative analysis of a transparent object using a phase distribution of wave. Therefore, the present invention is applicable to various uses taking those advantages. The novelty and predominance of the present invention to the conventional technology include: enabling four-dimensional (real-time+three-dimensional-space) large depth high resolution measurement of microbes swimming underwater or body tissues in culture solution; enabling continuous measurement of living body tissues using low energy irradiation; and enabling measurement of transparent biological tissues using light phase distribution.

Concrete examples of applications include: a distortionless high-resolution real time three-dimensional microscope for observing a living body cell or a minute creature moving in a medium; a high-speed precision real-time three-dimensional light measuring device for measuring a position or displacement, a variation, and a shape of surface of a moving microscopic subject by non-contact and non-destructive manner; and a high-speed three-dimensional imaging device for carrying out the high-speed image pick-up of a momentary phenomenon occurred in a minute space: Note that applications include a new application to a high-resolution tomographic apparatus for measuring the inside of a living body tissue with the high-resolution of a cell level.

This application is based on the Japan patent application 2010-155024, and the contents should unite to the present application invention as a result by referring to the specification and drawing of the above-mentioned patent application.

EXPLANATION OF LETTERS OR NUMERALS

| 1 | Holographic microscope |
|---|---|
| 10 | Recording device, image recording section |
| 10a | Light source |
| 10b | Optical system |

-continued

| | |
|---|---|
| 10c | Photodetector |
| 10d | Calculating section |
| 10e | Reference light wave obtaining section |
| 10f | Complex amplitude obtaining section |
| 11 | Image reconstruction section |
| 11a | Pixel number increase section |
| 11b | Spatial modulation section |
| 11c | Division section |
| 11d | Synthesis section |
| 11e | Plane wave expansion section |
| 14a | Division interpolation section |
| 14b | Spatial modulation section |
| 14c | Hologram composing section |
| 14d | Image generation section |
| 20 | Laser (light source) |
| 3 | Microscopic subject |
| 4 | Photodetector |
| g | Object light complex amplitude in-line hologram |
| $g_i$ | Minute hologram |
| $g_i'$ | Minute hologram |
| $g_j$ | Object light complex amplitude in-line hologram |
| h | Light wave (complex amplitude hologram) |
| G | Transformed function |
| $G_i'$ | Divided transform function |
| $G_i$ | Divided transform function |
| $I_{LR}$ | Interference fringe pattern |
| $J_{LR}$ | Complex amplitude in-line hologram |
| $I_{OR}$ | Off-axis hologram |
| $J_{LR}$ | Complex amplitude in-line hologram |
| $J_{OR}$ | Complex amplitude off-axis hologram |
| $J_{OL}$ | Complex amplitude in-line hologram |
| L | In-line spherical wave light |
| L, L2 | In-line spherical wave light for illuminating |
| O | Object light |
| P | Focal point |
| R | Off-axis reference light |
| $\phi_L$ | Phase of in-line spherical wave light (L or L2) |
| Σ | Synthetic minute hologram |

The invention claimed is:

1. A holographic microscope, comprising:
an image recording section which obtains an off-axis hologram ($I_{OR}$) of a microscopic subject by illuminating the microscopic subject with a spherical wave light (L or L2) as an illumination light, generates a complex amplitude in-line hologram ($J_{OL}$) from the off-axis hologram ($I_{OR}$), and records the complex amplitude in-line hologram ($J_{OL}$); and
an image reconstruction section which reconstructs an image from the complex amplitude in-line hologram ($J_{OL}$) recorded by the image recording section, wherein
the image recording section comprises:
a light source which emits a coherent light;
an optical system which propagates an illumination light, a reference light, and an object light;
a photodetector which records light intensity of the reference light and the object light;
a reference light wave obtaining section which records an interference fringe pattern ($I_{LR}$) between an in-line spherical wave light (L) and an off-axis reference light (R), which is made with the light source and the optical system, using the photodetector, and derives a complex amplitude hologram ($J_{LR}$) having recorded the off-axis reference light (R) by performing a spatial frequency filtering on the interference fringe pattern ($I_{LR}$); and
a complex amplitude obtaining section which illuminates a microscopic subject using the light source and the optical system with a spherical wave light (L or L2), which has the same focal point as the in-line spherical wave light (L), as an illumination light, and derives a complex amplitude off-axis hologram ($J_{OR}$) by performing a spatial frequency filtering on an off-axis hologram ($I_{OR}$) in which an object light (O) emitted from the microscopic subject is recorded with an off-axis reference light (R) using the photodetector, wherein
the image recording section generates and records a complex amplitude in-line hologram ($J_{OL}$) by eliminating a component of the reference light (R) from the complex amplitude off-axis hologram ($J_{OR}$) by performing a dividing process on data of the complex amplitude off-axis hologram ($J_{OR}$) derived by the complex amplitude obtaining section with data of the complex amplitude hologram ($J_{LR}$) obtained by the reference light wave obtaining section.

2. The holographic microscope according to claim 1, wherein
the image reconstruction section comprises:
a pixel number increase section which increases a number of pixels substantially by subdividing the spatial sampling interval of the complex amplitude in-line hologram ($J_{OL}$) and performing a data interpolation on a new sampling point produced by the subdividing;
a spatial modulation section which generates an object light complex amplitude in-line hologram (g) expressing the object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$) having the increased number of pixels increased by the pixel number increase section; and
a plane wave expansion section which derives a transform function (G) as a result of Fourier-transforming of the object light complex amplitude in-line hologram (g) and expands the object light (O) using the transform function (G) and spatial frequencies (u, v, w) satisfying the dispersion relation of a plane wave, wherein
the image reconstruction section generates a light wave (h) on a hologram plane or on an arbitrary position before and behind thereof.

3. The holographic microscope according to claim 2, wherein the plane wave expansion section comprises:
a division section which divides the object light complex amplitude in-line hologram (g) into a plurality of minute holograms ($g_i$); and
a synthesis section which generates a synthetic minute hologram (Σ) by piling up mutually each of the minute holograms ($g_i$) generated by the division section, wherein
the plane wave expansion section derives the transform function (G) by Fourier-transforming the synthetic minute hologram (Σ) generated by the synthesis section.

4. The holographic microscope according to claim 1, wherein
the image reconstruction section comprises:
a division interpolation section which generates a plurality of minute holograms ($g_i'$) having a substantially increased number of pixels by dividing the complex amplitude in-line hologram ($J_{OL}$) into a plurality of minute holograms, subdividing the spatial sampling interval of each of the minute holograms, and performing a data interpolation on each new sampling point produced by the subdividing;
a spatial modulation section which generates each of object light complex amplitude in-line holograms ($g_i$) corresponding to each of the holograms ($g_i'$) expressing an object light on a hologram plane by performing a spatial heterodyne modulation, to eliminate a component of the in-line spherical wave light (L) using beforehand obtained phase ($\phi_L$) spherical wave light (L), on each of the minute holograms ($g_i'$) having the increased number of pixels increased by the division interpolation section;

a hologram composing section which generates a synthetic minute hologram ($\Sigma$) by piling up mutually each of the object light complex amplitude in-line holograms ($g_j$) generated by the spatial modulation section; and an image generation section which generates an image on a hologram plane or on an arbitrary position before and behind thereof by deriving a transform function (G) as a result of Fourier-transforming of the synthetic minute hologram ($\Sigma$) generated by the hologram composing section, and expanding the object light (O) using the transform function (G) and spatial frequencies (u, v, w) satisfying the dispersion relation of a plane wave.

5. The holographic microscope according to claim 1, wherein the image reconstruction section comprises:

a spatial modulation section which generates an object light complex amplitude in-line hologram (g) expressing the object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$);

a division section which divides the object light complex amplitude in-line hologram (g) into a plurality of minute holograms ($g_i$);

a frequency reduction section which generates each of low frequency minute holograms ($g_i \cdot \exp(-i\phi_i)$) of reduced spatial frequency by performing a spatial heterodyne modulation on each of the minute holograms ($g_i$), respectively, using phase ($\phi_i$) of a parallel light ($L_i$) going to the center of each of the minute holograms ($g_i$) from the focal point of the in-line spherical wave light (L);

a Fourier-transform section which generates each divided transform function ($G'_i$) as a result of discrete Fourier-transforming of each of the low frequency minute holograms ($g_i \cdot \exp(-i\phi_i)$), respectively; and an image generation section which generates an image on a hologram plane or on an arbitrary position before and behind thereof by generating each divided transform function ($G'_i \cdot \exp(i\phi_i)$) of increased spatial frequency by performing a spatial heterodyne modulation on each of the divided transform functions ($G'_i$), and expanding the object light (O) using a transform function (G) composed of whole of those divided transform functions ($G'_i \cdot \exp(i\phi_i)$) and spatial frequencies (u, v, w) satisfying the dispersion relation of a plane wave.

6. The holographic microscope according to claim 1, wherein the image reconstruction section comprises:

a spatial modulation section which generates an object light complex amplitude in-line hologram (g) expressing the object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$);

a division section which divides the object light complex amplitude in-line hologram (g) into a plurality of minute holograms ($g_i$);

a Fourier-transform section which obtains each divided transform function ($G_i$) as a result of discrete Fourier-transforming of each of the minute holograms ($g_i$), respectively; and an image generation section which generates an image on a hologram plane or on an arbitrary position before and behind thereof by expanding the object light (O) using a transform function (G) composed of whole of those divided transform functions ($G_i$) and spatial frequencies (u, v, w) satisfying the dispersion relation of a plane wave.

7. The holographic microscope according to claim 1, wherein the image recording section uses a pulsed laser as the coherent light source for obtaining a hologram.

8. The holographic microscope according to claim 7, wherein the image recording section generates and records the complex amplitude in-line hologram ($J_{OL}$) in color by obtaining the off-axis hologram ($I_{OR}$) using a plurality of lasers having different wavelength zone mutually, and the image reconstruction section reconstructs an image in color from the complex amplitude in-line hologram ($J_{OL}$) in color.

9. A method for recording a hologram image of a microscopic subject, comprising the steps of:

obtaining a complex amplitude hologram ($J_{LR}$) as a reference light wave obtaining process by recording an interference fringe pattern ($I_{LR}$) made by an in-line spherical wave light (L) and an off-axis reference light (R) using a photodetector, and performing a spatial frequency filtering on the recorded interference fringe pattern ($I_{LR}$) to obtain the complex amplitude hologram ($J_{LR}$) having recorded the off-axis reference light (R);

recording an object light (O) emitted from a microscopic subject by illuminating the microscopic subject with a spherical wave light (L or L2) having the same focal point as that of the in-line spherical wave light (L) as an off-axis hologram ($I_{OR}$) using the off-axis reference light (R) and the photodetector;

obtaining a complex amplitude off-axis hologram ($J_{OR}$) as a complex amplitude obtaining process by performing a spatial frequency filtering on the off-axis hologram ($I_{OR}$); and recording a complex amplitude in-line hologram ($J_{OL}$) generated by eliminating a component of the reference light (R) from the complex amplitude off-axis hologram ($J_{OR}$) by dividing data of the complex amplitude off-axis hologram ($J_{OR}$) obtained in the complex amplitude obtaining process by data of the complex amplitude hologram ($J_{LR}$) obtained in the reference light wave obtaining process.

10. The method for recording a hologram image of a microscopic subject according to claim 9, wherein the off-axis reference light (R) is a spherical wave.

11. The method for recording a hologram image of a microscopic subject according to claim 9, wherein the object light (O) is a transmitted light through the illuminated microscopic subject.

12. The method for recording a hologram image of a microscopic subject according to claim 9, wherein the object light (O) is a reflected light from the illuminated microscopic subject.

13. A method for generating a hologram for high-resolution image reconstruction from a complex amplitude in-line hologram ($J_{OL}$) of a microscopic subject obtained using an in-line spherical wave light (L or L2), comprising the steps of:
   increasing a number of pixels substantially as a pixel number increase process by subdividing the spatial sampling interval of the complex amplitude in-line hologram ($J_{OL}$), and performing a data interpolation on a new sampling point produced by the subdividing; and
   generating an object light complex amplitude in-line hologram (g) expressing an object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$) having an increased number of pixels increased in the pixel number increase process.

14. The method for generating a hologram according to claim 13, wherein
   the data interpolation is performed with a 3rd equation.

15. A method for reconstructing an image from a complex amplitude in-line hologram ($J_{OL}$) of a microscopic subject obtained using an in-line spherical wave light (L or L2), comprising the steps of:
   increasing a number of pixels substantially as a pixel number increase process by subdividing the spatial sampling interval of the complex amplitude in-line hologram ($J_{OL}$), and performing a data interpolation on a new sampling point produced by the subdividing;
   generating an object light complex amplitude in-line hologram (g) expressing an object light on a hologram plane by performing a spatial heterodyne modulation, to eliminate a component of the in-line spherical wave light (L) using beforehand obtained phase ($\phi_L$) of the in-line spherical wave light (L), on the complex amplitude in-line hologram ($J_{OL}$) having an increased number of pixels increased in the pixel number increase process; and
   expanding the object light (O) as a plane wave expansion process by using spatial frequencies (u, v, w) satisfying the dispersion relation of a plane wave and a transform function (G) derived as a result of Fourier-transforming of the object light complex amplitude in-line hologram (g), wherein
   the method generates a light wave (h) on a hologram plane or on an arbitrary position before and behind thereof.

16. The method for reconstructing an image according to claim 15, wherein
   the plane wave expansion process comprises the steps of:
   dividing the object light complex amplitude in-line hologram (g) as a division process into a plurality of minute holograms ($g_i$); and
   generating a synthetic minute hologram ($\Sigma$) as a synthesis process by piling up mutually each of the minute holograms ($g_i$) obtained by the division process, wherein
   the plane wave expansion process derives the transform function (G) by Fourier-transforming the synthetic minute hologram ($\Sigma$) generated by the synthesis process.

17. A method for reconstructing an image from a complex amplitude in-line hologram ($J_{OL}$) of a microscopic subject obtained using an in-line spherical wave light (L or L2), comprising the steps of:
   generating a plurality of minute holograms ($g_i'$) having a substantially increased number of pixels as a division interpolation process, wherein the minute holograms ($g_i'$) are generated by subdividing the spatial sampling interval of the complex amplitude in-line hologram ($J_{OL}$) performing a data interpolation on each new sampling point produced by the subdividing, and dividing the complex amplitude in-line hologram (JO having a substantially increased number of pixels into the plurality of minute holograms;
   generating each of object light complex amplitude in-line holograms ($g_j$) corresponding to each of the holograms ($g_i'$) and expressing the object light on a hologram plane as a spatial modulation process by performing a spatial heterodyne modulation, to eliminate a component of the in-line spherical wave light (L) using beforehand obtained phase ($\phi_L$) of the in-line spherical wave light (L), on each of the minute holograms ($g_i'$) having the increased number of pixels increased in the division interpolation process;
   generating a synthetic minute hologram ($\Sigma$) as a hologram composing process by piling up mutually each of the object light complex amplitude in-line holograms ($g_j$) generated by the spatial modulation process; and
   generating an image on a hologram plane or on an arbitrary position before and behind thereof as an image generation process by deriving a transform function (G) as a result of Fourier-transform of the synthetic minute hologram ($\Sigma$) generated by the hologram composing process and expanding the object light (O) using the transform function (G) and spatial frequencies (u, v, w) satisfying the dispersion relation of a plane wave.

18. The method for reconstructing an image according to claim 15, wherein
   the data interpolation is performed with a 3rd equation.

19. A method for reconstructing an image of a microscopic subject through numerical computations from a complex amplitude in-line hologram ($J_{OL}$) which was generated by processing a hologram obtained by illuminating the microscopic subject using an in-line spherical wave light (L or L2) as an illumination light and which contains information of the in-line spherical wave light (L) and information of an object light (O) emitted from the microscopic subject, comprising the steps of:
   generating an object light complex amplitude in-line hologram (g) expressing the object light (O) on a hologram plane by performing a spatial heterodyne modulation, to eliminate a component of the in-line spherical wave light (L), by multiplying the complex amplitude in-line hologram ($J_{OL}$) by a phase factor ($\exp(i\phi_L)$) made of beforehand obtained phase ($\phi_L$) of the in-line spherical wave light (L), on the complex amplitude in-line hologram ($J_{OL}$);
   dividing the object light complex amplitude in-line hologram (g) into a plurality of minute holograms ($g_i$);
   generating each of low frequency minute hologram ($g_i \cdot \exp(-i\phi_i)$) of reduced spatial frequency by performing a spatial heterodyne modulation on each of the minute holograms ($g_i$) by multiplying each of the minute holograms ($g_i$) by a phase factor ($\exp(-\phi_i)$) made of phase ($\phi_i$) of a parallel light ($L_i$) going to the center of each of the minute holograms ($g_i$) from the focal point of the in-line spherical wave light (L), respectively;

obtaining each of divided transform functions ($G'_i$) as a result of discrete Fourier-transforming of each of the low frequency minute holograms ($g_i \cdot \exp(-i\phi_i)$), respectively; and generating an image on a hologram plane or on an arbitrary position before and behind thereof by generating each of divided transform functions ($G'_i \cdot \exp(i\phi_i)$) of increased spatial frequency by performing a spatial heterodyne modulation on each of the divided transform functions ($G'_i$), by multiplying each of the divided transform functions ($G'_i$) by the reciprocal of the phase factor ($\exp(-i\phi_i)$) used for generating the low frequency minute hologram ($g_i \cdot \exp(-i\phi_i)$), respectively, and carrying out a plane wave expansion to get the object light (O) on the arbitrary position using a transform function (G) composed of whole of those divided transform functions ($G'_i \cdot \exp(i\phi_i)$) of increased spatial frequency as weighting for superposing plane waves in the expansion and spatial frequencies (u, v, w) satisfying the dispersion relation of a plane wave.

20. A method for reconstructing an image of a microscopic subject through numerical computations from a complex amplitude in-line hologram ($J_{OL}$), which was generated by processing a hologram obtained by illuminating the microscopic subject using an in-line spherical wave light (L or L2) as an illumination light and which contains information of the in-line spherical wave light (L) and information of an object light (O) emitted from the microscopic subject, comprising the steps of:

generating an object light complex amplitude in-line hologram (g) expressing the object light (O) on a hologram plane by performing a spatial heterodyne modulation, to eliminate a component of the in-line spherical wave light (L), by multiplying the complex amplitude in-line hologram ($J_{OL}$) by a phase factor ($\exp(i\phi_L)$) made of beforehand obtained phase ($\phi_L$) of the in-line spherical wave light (L), on the complex amplitude in-line hologram ($J_{OL}$);

dividing the object light complex amplitude in-line hologram (g) into a plurality of minute holograms ($g_i$);

generating each of divided transform functions ($G_i$) as a result of discrete Fourier-transforming of each of the minute holograms ($g_i$), respectively; and generating an image on a hologram plane or on an arbitrary position before and behind thereof by carrying out a plane wave expansion to get the object light (O) on the arbitrary position using a transform function (G) composed of whole of those divided transform functions ($G_i$) as weighting for superposing plane waves in the expansion and spatial frequencies (u, v, w) satisfying the dispersion relation of a plane wave.

21. The holographic microscope according to claim 1, wherein the image reconstruction section comprises:

a division interpolation section which generates a plurality of minute holograms ($g_i'$) by subdividing the spatial sampling interval of the complex amplitude in-line hologram ($J_{OL}$), performing a data interpolation on each new sampling point produced by the subdividing, and dividing the complex amplitude in-line hologram ($J_{OL}$) having a substantially increased number of pixels into the plurality of minute holograms;

a spatial modulation section which generates each of object light complex amplitude in-line holograms ($g_j$) corresponding to each of the holograms ($g_i'$) expressing an object light on a hologram plane by performing a spatial heterodyne modulation, to eliminate a component of the in-line spherical wave light (L) using beforehand obtained phase ($\phi_L$) of the in-line spherical wave light (L), on each of the minute holograms ($g_i'$) having the increased number of pixels increased by the division interpolation section;

a hologram composing section which generates a synthetic minute hologram ($\Sigma$) by piling up mutually each of the object light complex amplitude in-line holograms ($g_j$) generated by the spatial modulation section; and an image generation section which generates an image on a hologram plane or on an arbitrary position before and behind thereof by deriving a transform function (G) as a result of Fourier-transforming of the synthetic minute hologram ($\Sigma$) generated by the hologram composing section, and expanding the object light (O) using the transform function (G) and spatial frequencies (u, v, w) satisfying the dispersion relation of a plane wave.

22. The method for generating a hologram according to claim 13, wherein the data interpolation is performed with a sinc function.

23. The method for reconstructing an image according to claim 15, wherein
the data interpolation is performed with a sinc function.

24. A method for reconstructing an image from a complex amplitude in-line hologram ($J_{OL}$) of a microscopic subject obtained using an in-line spherical wave light (L or L2), comprising the steps of:

generating a plurality of minute holograms ($g_i'$) having a substantially increased number of pixels as a division interpolation process, wherein the minute holograms ($g_i'$) are generated by dividing the complex amplitude in-line hologram ($J_{OL}$) into a plurality of minute holograms, subdividing the spatial sampling interval of each of the minute holograms, and performing a data interpolation on a new sampling point produced by the subdividing;

generating each of object light complex amplitude in-line holograms ($g_j$) corresponding to each of the holograms ($g_i'$) and expressing the object light on a hologram plane as a spatial modulation process by performing a spatial heterodyne modulation, to eliminate a component of the in-line spherical wave light (L) using beforehand obtained phase ($\phi_L$) of the in-line spherical wave light (L), on each of the minute holograms ($g_i'$) having the increased number of pixels increased in the division interpolation process;

generating a synthetic minute hologram ($\Sigma$) as a hologram composing process by piling up mutually each of the object light complex amplitude in-line holograms ($g_j$) generated by the spatial modulation process; and generating an image on a hologram plane or on an arbitrary position before and behind thereof as an image generation process by deriving a transform function (G) as a result of Fourier-transform of the synthetic minute hologram ($\Sigma$) generated by the hologram composing process and expanding the object light (O) using the transform function (G) and spatial frequencies (u, v, w) satisfying the dispersion relation of a plane wave.

* * * * *